United States Patent
Pontaza Rodas et al.

(10) Patent No.: US 11,218,308 B2
(45) Date of Patent: Jan. 4, 2022

(54) POST-QUANTUM ASYMMETRIC KEY CRYPTOSYSTEM WITH ONE-TO-MANY DISTRIBUTED KEY MANAGEMENT BASED ON PRIME MODULO DOUBLE ENCAPSULATION

(71) Applicant: NATIONAL CHIAO TUNG UNIVERSITY, Hsinchu (TW)

(72) Inventors: Ricardo Neftali Pontaza Rodas, Taipei (TW); Ying-Dar Lin, Taipei (TW)

(73) Assignee: National Chiao Tung University, Hsinchu (TW)

( * ) Notice: Subject to any disclaimer, the term of this patent is extended or adjusted under 35 U.S.C. 154(b) by 301 days.

(21) Appl. No.: 16/448,445

(22) Filed: Jun. 21, 2019

(65) Prior Publication Data

US 2020/0106606 A1    Apr. 2, 2020

(30) Foreign Application Priority Data

Sep. 27, 2018 (TW) ................. 107134068

(51) Int. Cl.
*H04L 9/08* (2006.01)
*H04L 9/30* (2006.01)

(52) U.S. Cl.
CPC .......... *H04L 9/0869* (2013.01); *H04L 9/0852* (2013.01); *H04L 9/3093* (2013.01); *H04L 2209/08* (2013.01)

(58) Field of Classification Search
CPC ... H04L 9/0869; H04L 9/0852; H04L 9/3093; H04L 2209/08
USPC ......................................................... 380/46
See application file for complete search history.

(56) References Cited

U.S. PATENT DOCUMENTS

| 4,405,829 A | 9/1983 | Rivest et al. |
| 6,141,420 A | 10/2000 | Vanstone et al. |
| 6,493,449 B2 | 12/2002 | Anshel et al. |
| 7,421,076 B2 | 9/2008 | Stein et al. |
| 2015/0156018 A1* | 6/2015 | Ohya ............... H04L 9/0869 380/46 |

(Continued)

OTHER PUBLICATIONS

Post-Quantum Lattice-Based Cryptography Implementations: A Survey Hamid Nejatollahi, Niki Dutt, Sandip RAy, Francesco Regazzoni, Indranil Banerjee, Rosario Cammarota ACM Computing Surveys vol. 51 Issue 6 Feb. 2019 Article No. 129 pp. 1-41 (Year: 2019).*

(Continued)

*Primary Examiner* — Kambiz Zand
*Assistant Examiner* — Mohammad S Shams
(74) *Attorney, Agent, or Firm* — Brooks Kushman P.C.

(57) ABSTRACT

In a post-quantum asymmetric key generation method and system, a processing unit generates, based on a prime and an arithmetic function or a classical string, a prime vector which has an infinite number of components; generates a prime array based on the prime vector; generates an associated matrix based on the prime array; obtains, based on the associated matrix and a first reference prime, a first reference inverse prime array that serves as a private key; and obtains a public key that is paired with the private key based on a second reference inverse prime array. The second reference inverse prime array is obtained based on the associated matrix, the first reference prime, a second reference prime, and a randomization array.

15 Claims, 7 Drawing Sheets

(56) References Cited

U.S. PATENT DOCUMENTS

| | | | | |
|---|---|---|---|---|
| 2016/0234009 | A1* | 8/2016 | Li | H04L 9/0852 |
| 2017/0063530 | A1* | 3/2017 | Fiske | H04L 9/0891 |
| 2019/0116035 | A1* | 4/2019 | Mustafa | H04L 9/302 |
| 2019/0312728 | A1* | 10/2019 | Poeppelmann | H04L 9/0662 |
| 2019/0319804 | A1* | 10/2019 | Mathew | H04L 9/0869 |
| 2020/0322141 | A1* | 10/2020 | Kinjo | H04L 9/0822 |

OTHER PUBLICATIONS

Post-Quantum Cryptography on FPGAs: The Niederreiter Cryptosystem: Extended Abstract Wen Wang, Jakub Szefer, Ruben Niederhagen GLSVLSI '18: Proceedings of the 2018 on Great Lakes Symposium on VLSIMay 2018, pp. 371 (Year: 2018).*

Post-Quantum Cryptography in Embedded Systems Sounes Marzougui, Julian Kramer ARES '19: Proceedings of the 14th International Conference on Availability, Reliability and Security. Aug. 2019, Article No. 48, pp. 1-7 (Year: 2019).*

Rivest, Ronald L.; Shamir, Adi; Adleman, Leonard. "A method for obtaining digital signatures and public-key cryptosystems" Communications of the ACM, 1978, vol. 21, No. 2, p. 120-126.

Standard, "Advance Encryption" Federal Information Processing Standard (FIPS) Publication 197. National Bureau of Standards, US Department of Commerce, Washington, DC, 2001.

Bos, Joppe W., et al. "Elliptic curve cryptography in practice" International Conference on Financial Cryptography and Data Security. Springer Berlin Heidelberg, 2014. p. 157-175.

Schneier, Bruce. "Description of a new variable-length key, 64-bit block cipher (Blowfish)" International Workshop on Fast Software Encryption. Springer Berlin Heidelberg, 1993. p. 191-204.

* cited by examiner

POST-QUANTUM ASYMMETRIC KEY CRYPTOSYSTEM WITH ONE-TO-MANY DISTRIBUTED KEY MANAGEMENT BASED ON PRIME MODULO DOUBLE ENCAPSULATION

CROSS-REFERENCE TO RELATED APPLICATION

This application claims priority of Taiwanese Invention Patent Application No. 107134068, filed on Sep. 27, 2018.

FIELD

The disclosure relates to an asymmetric key generation method, and more particularly to a lattice algebra based post-quantum asymmetric key generation method and system, key-refresh method, encryption method, decryption method, and encrypted communication system.

BACKGROUND

Classical cryptosystems can be classified into two main categories: symmetric key algorithms and asymmetric key algorithms. The symmetric key algorithms, such as AES (advanced encryption standard), use shared key to perform encryption and decryption. The asymmetric key algorithms use different keys, namely, paired public key and private key, to perform encryption and decryption. For example, RSA is one of the first public-key cryptosystems and is widely used for secure data transmission; NTRU (number theory research unit) is another asymmetric key algorithm; and ECC (elliptic curve cryptography) is an approach to public key cryptography based on the algebraic structure of elliptic curves. Implementations of the symmetric key algorithms require a secure channel for key exchange between two parties. Although a secure channel is not necessary for implementations of the asymmetric key algorithms, the asymmetric key algorithms may require relatively large amount of computation for generation of the paired keys, encryption and decryption. In comparison to RSA, although ECC may provide better security, more time is required on encryption and decryption.

The classical cryptosystems may have the following drawbacks:

1. Protocols for current asymmetric key algorithms cannot send large amounts of data in a short amount of time, because encryption and decryption are done for one character at a time.

2. Current asymmetric key algorithms use a public key and a private key that have the same mathematical characteristics such as belonging to the same algebraic group, ring or vector space, and that are similar in nature, so they are prone to plaintext attack or brute force attack.

3. For current asymmetric key algorithms, if a user changes his/her public key for a new one, all the other users need to update their private keys to be paired with the new public key, otherwise any possible communication from a user who keeps on using the old private key would be invalid.

4. If a system setup requires everyone to make a key refresh, a centralized entity that indicates the key refresh time is needed.

5. The integer factorization-based algorithms (e.g., RSA, DSA) or the discrete logarithm problem based algorithms (e.g., SCC) are weak against Shor's and Grover's algorithms based post-quantum attacks.

6. Distributed key refresh does not exist in the networks using RSA, AES and NTRU because the distributed key refresh is not part of the fundamental definition of the protocols for these cryptosystems.

7. Classical public key cryptosystems have tightly coupled public-private keys (i.e., each public key is paired with only a unique private key). Attacks on one of the paired keys often reveal information of the other one.

SUMMARY

Therefore, an object of the disclosure is to provide a lattice algebra based post-quantum asymmetric key generation method and system, a key-refresh mechanism, an encryption method, a decryption method, and an encrypted communication system that can alleviate at least one of the drawbacks of the prior art.

According to the disclosure, the post-quantum asymmetric key generation method is implemented by a processing unit, and includes:

A) generating, based on a prime p and one of an arithmetic function and a classical string that serves as a seed, a vector denominated p-vector and denoted as $\vec{f}_p$ that depends on the prime p and that has an infinite number of components, wherein the p-vector $\vec{f}_p$ is defined as:

$$\vec{f}_p := [f(p^0), f(p^1), f(p^2), f(p^3), \ldots],$$

where $f$ represents said one of the arithmetic function and the classical string that serves as the seed;

B) defining the concept of instance as I=(p, s, t), where p is a prime, and s and t are user-defined positive integers;

C) generating, based on the p-vector $\vec{f}_p$ and the instance I=(p, s, t), a p-array $\vec{\mathcal{f}}_p|_{s,t}^m$ that has m number of components and that relates to the prime p and that is defined as:

$$\vec{\mathcal{f}}_p|_{s,t}^m := \sum_{i=0}^{t} [f(p^{s+im}), \ldots, f(p^{s+im+(m-1)})],$$

wherein the p-array $\vec{\mathcal{f}}_p|_{s,t}^m$ can also be represented as $\vec{\mathcal{f}}|^m$ if I=(p, s, t) is known;

D) based on the p-array $\vec{\mathcal{f}}|^m$, generating an associated matrix $[\vec{\mathcal{f}}|^m]$ that is defined as:

$$[\vec{\mathcal{f}}|^m] = \begin{pmatrix} \vec{\mathcal{f}}|^m(0) & \vec{\mathcal{f}}|^m(1) & \cdots & \vec{\mathcal{f}}|^m(m-1) \\ \vec{\mathcal{f}}|^m(m-1) & \vec{\mathcal{f}}|^m(0) & \cdots & \vec{\mathcal{f}}|^m(m-2) \\ \vdots & \vdots & \ddots & \vdots \\ \vec{\mathcal{f}}|^m(1) & \vec{\mathcal{f}}|^m(2) & \cdots & \vec{\mathcal{f}}|^m(0) \end{pmatrix},$$

where $\vec{\mathcal{f}}|^m(j)$ represents a $(j+1)^{th}$ one of the m number of components of the p-array, $0 \leq j \leq (m-1)$;

E) based on the associated matrix $[\vec{\mathcal{f}}|^m]$ and a modulus $\ell$ which is a user-defined positive integer, generating an inverse p-array $\vec{\mathcal{F}}_\ell|^m$ with respect to the modulus $\ell$, which is defined as:

$$\vec{\mathcal{F}}_\ell|^m := (\mathcal{L}_\ell [1,0,\ldots,0][\vec{\mathcal{f}}|^m]^*)(\mod \ell),$$

where $\mathcal{L}_\ell$ represents an inverse modulus of a determinant of the associated matrix $[\vec{\mathcal{f}}|^m]$ with respect to the modulus $\ell$, and is defined as: $\tilde{L}_\ell := (\det[\overleftrightarrow{\mathcal{f}}|^m])^{-1} \pmod{\ell}$, and $[\overleftrightarrow{\mathcal{f}}|^m]^*$ represents an adjoint matrix of the associated matrix $[\overleftrightarrow{\mathcal{f}}|^m]$;

F) arbitrarily selecting a first reference prime $p_1$, and determining a second reference prime $p_2$, based on a predetermined criterion that relates to the first reference prime $p_1$, a greatest one of the m number of components of the p-array $\overrightarrow{\mathcal{f}}|^m$ which is denoted by b, a first reference positive integer ã, and a second parameter set S that is composed of the parameter m, a second reference positive integer b̃ and a third reference positive integer r, wherein the predetermined criterion includes $p_2 > \max(p_1 m \tilde{a} \tilde{b}, mbr)$;

G) acquiring a first reference inverse p-array $\overleftarrow{\mathcal{F}}_{p_1}|^m$ and a second reference inverse p-array by $\overleftarrow{\mathcal{F}}_{p_2}|^m$ by respectively making the first reference prime $p_1$ and the second reference prime $p_2$ serve as the modulus $\ell$ in the inverse p-array $\overleftarrow{\mathcal{F}}_\ell|^m$, the first reference inverse p-array $\overleftarrow{\mathcal{F}}_{p_1}|^m$ serving as a private $K_{private}$, which is defined as $K_{private} = (\overrightarrow{\mathcal{f}}|^m, p_1, \tilde{a})$; and H) generating a public key $K_{public}$ with respect to the second reference inverse p-array $\overleftarrow{\mathcal{F}}_{p_2}|^m$, the first reference prime $p_1$, the second reference prime $p_2$, and the key-generation randomization array $\overleftrightarrow{R}|_{(\tilde{a})}^m$, wherein the key-generation randomization array $\overleftrightarrow{R}|_{(\tilde{a})}^m$ has m number of numerical components between 0 and the first reference positive integer ã, and the public key $K_{public}$ is paired with the private key $K_{private}$, and is an array $\overleftrightarrow{K}_{public}|^m$ that includes m number of numerical components and that is also denoted as $K_{public} = (\overleftrightarrow{K}_{public}|^m, p_2)$, representing $\overleftrightarrow{K}_{public}|^m := \text{Rand}(\overleftarrow{\mathcal{F}}_{p_2}|^m, p_1, \tilde{a})(\bmod p_2)$;

wherein $\text{Rand}(\overleftarrow{\mathcal{F}}_{p_2}|^m, p_1, \tilde{a})$ is a key-generation randomization function of the second reference inverse p-array $\overleftarrow{\mathcal{F}}_{p_2}|^m$ with respect to the key-generation randomization array $\overleftrightarrow{R}|_{(\tilde{a})}^m$, and is defined as $\text{Rand}(\overleftarrow{\mathcal{F}}_{p_2}|^m, p_1, \tilde{a}) = p_1(\overleftarrow{\mathcal{F}} p_2|^m \circledast \overleftrightarrow{R}|_{(\tilde{a})}^m)$, where $\circledast$ represents a convolution multiplication operator.

According to this disclosure, the encryption method is implemented by a processor, and includes:

using the public key $K_{public}$ generated according to the post-quantum asymmetric key generation method of this disclosure, the second reference prime $p_2$ used in the post-quantum asymmetric key generation method of this disclosure, and an encryption randomization array $\overleftrightarrow{R}|_{(\tilde{b})}^m$ that has m number of numerical components between 0 and the second reference positive integer b̃ used in the post quantum asymmetric key generation method of this disclosure to perform an encryption procedure on a data array $\overleftrightarrow{M}|^m$ that corresponds to a plaintext to be transmitted and that has m number of numerical components, and acquiring a ciphertext $\overrightarrow{Cipher}|^m$ with respect to the encryption randomization array $\overleftrightarrow{R}|_{(\tilde{b})}^m$, wherein the ciphertext $\overrightarrow{Cipher}|^m$ has m number of encrypted numerical components.

According to this disclosure, the decryption method is implemented by a processor, and includes:

using the p-array $\overrightarrow{\mathcal{f}}|^m$, the private key $K_{private}$, the first reference prime $p_1$ and the second reference prime $p_2$ that are used in the post-quantum asymmetric key generation. Method of this disclosure to perform a decryption procedure on a ciphertext $\overrightarrow{Cipher}|^m$, and acquiring a plaintext array $\overleftrightarrow{M_1}|^m$ that has m number of decrypted numerical components, wherein the ciphertext $\overrightarrow{Cipher}|^m$ is generated by:

using the public key generated according to the post-quantum asymmetric key generation method of this disclosure, the second reference prime $p_2$ used in the post-quantum asymmetric key generation method of this disclosure, and an encryption randomization array $\overleftrightarrow{R}|_{(\tilde{b})}^m$ that has m number of numerical components between 0 and the second reference positive integer b̃ used in the post-quantum asymmetric key generation method of this disclosure to perform an encryption procedure on a data array $\overleftrightarrow{M}|^m$ that corresponds to a plaintext to be transmitted and that has m number of numerical components, and acquiring the ciphertext $\overrightarrow{Cipher}|^m$ that relates to the encryption randomization array $\overleftrightarrow{R}|_{(\tilde{b})}^m$ and that has m number of encrypted numerical components.

According to this disclosure, the post-quantum asymmetric key generation system includes:

a p-vector generation module configured to generate, based on a prime p and one of an arithmetic function and a classical string that serves as a seed, a p-vector $\overrightarrow{f}_p$ that relates to the prime p and that has an infinite number of components, wherein the p-vector $\overrightarrow{f}_p$ is defined as:

$$\overrightarrow{f}_p := [f(p^0), f(p^1), f(p^2), f(p^3), \ldots],$$

where $f$ represents said one of the arithmetic function and the classical string that serves as the seed;

a p-array generation module coupled to said p-vector generation module, and configured to generate, based on the p-vector $\overrightarrow{f}_p$, a p-array $\overrightarrow{\mathcal{f}}_p|_{s,t}^m$ that has m number of components and that relates to the prime p and that is defined as:

$$\overrightarrow{\mathcal{f}}_p\Big|_{s,t}^m := \sum_{i=0}^{t} [f(p^{s+im}), \ldots, f(p^{s+im+(m-1)})],$$

where each of parameters m, s and t is a user-defined positive integer, and the prime p and the parameters s, t cooperatively compose a first parameter set I, and wherein the p-array $\overrightarrow{\mathcal{f}}_p|_{s,t}^m$ is also represented as $\overrightarrow{\mathcal{f}}|^m$;

an associated matrix generation module coupled to said p-array generation module, and configured to generate, based on the p-array $\overrightarrow{\mathcal{f}}|^m$, an associated matrix $[\overleftrightarrow{\mathcal{f}}|^m]$ that is defined as:

$$[\overleftrightarrow{\mathcal{f}}|^m] = \begin{pmatrix} \overrightarrow{\mathcal{f}}|^m(0) & \overrightarrow{\mathcal{f}}|^m(1) & \ldots & \overrightarrow{\mathcal{f}}|^m(m-1) \\ \overrightarrow{\mathcal{f}}|^m(m-1) & \overrightarrow{\mathcal{f}}|^m(0) & \ldots & \overrightarrow{\mathcal{f}}|^m(m-2) \\ \vdots & \vdots & \ddots & \vdots \\ \overrightarrow{\mathcal{f}}|^m(1) & \overrightarrow{\mathcal{f}}|^m(2) & \ldots & \overrightarrow{\mathcal{f}}|^m(0) \end{pmatrix},$$

where $\overrightarrow{\mathcal{f}}|^m(j)$ represents a $(j+1)^{th}$ one of the m number of components of the p-array, $0 \leq j \leq (m-1)$;

an inverse p-array generation module coupled to said associated matrix generation module, and configured to generate, based on the associated matrix $[\overleftrightarrow{\mathcal{f}}|^m]$ and a modulus $\ell$ which is a user-defined positive integer, an inverse p-array $\overleftarrow{\mathcal{F}}_\ell|^m$ with respect to the modulus $\ell$, which is defined as:

$$\overleftarrow{\mathcal{F}}_\ell|^m := (\tilde{L}_\ell[1,0,\ldots,0][\overleftrightarrow{\mathcal{f}}|^m]^*)(\bmod \ell),$$

where $L_\ell$ represents an inverse modulus of the determinant of the associated matrix $[\overleftrightarrow{f}|^m]$ with respect to the modulus $\ell$, and is defined as: $L_\ell :=(\det[\overleftrightarrow{f}|^m])^{-1}(\mod \ell)$, and $[\overleftrightarrow{f}|^m]^*$ represents an adjoint matrix of the associated matrix $[\overleftrightarrow{f}|^m]$;

- a reference prime determining module configured to arbitrarily select a first reference pride $p_1$, and to determine a second reference prime $p_2$ based on a predetermined criterion that relates to the first reference prime $p_1$, a greatest one of the m number of components of the p-array $\overrightarrow{f}|^m$ which is denoted by b, a first reference positive integer $\tilde{a}$, and a second parameter set S that is composed of the parameter m, a second reference positive integer $\tilde{b}$ and a third reference positive integer r, wherein the predetermined criterion includes $p_2 > \max(p_1 m\tilde{a}\tilde{b}, mbr)$;
- a private key generation module coupled to said inverse p-array generation module and said reference prime determining module, and configured to acquire a first reference inverse array $\overleftarrow{F}_{p_1}|^m$ by making the first reference prime $p_1$ serve as the modulus $\ell$ in the inverse p-array $\overleftarrow{F}_\ell|^m$, the first reference inverse p-array $\overleftarrow{F}_{p_1}|^m$ serving as a private key $K_{private}$, which is defined as $K_{private}=(\overrightarrow{f}|^m, p_1, \tilde{a})$; and
- a public key generation module coupled to said inverse p-array generation module and said reference prime determining module, and configured to acquire a second reference inverse p-array $\overleftarrow{F}_{p_2}|^m$ by making the second reference prime $p_2$ serve as the modulus $\ell$ in the inverse p-array $\overleftarrow{F}_\ell|^m$, and to generate a public key $K_{public}$ with respect to a key-generation randomization array $\overleftrightarrow{R}|_{(\tilde{a})}^m$ based on the second reference inverse p-array $\overleftarrow{F}_{p_2}|^m$, the first reference prime $p_1$, the second reference prime $p_2$, and the key generation randomization array $\overleftrightarrow{R}|_{(\tilde{a})}^m$, wherein the key-generation randomization array $\overleftrightarrow{R}|_{(\tilde{a})}^m$ has m number of numerical components between 0 and the first reference positive integer $\tilde{a}$, and the public key $K_{public}$ is paired with the private key $K_{private}$, and is an array $\overleftrightarrow{R}_{public}|^m$ that includes m number of numerical components and that is also denoted as $K_{public}=(\overleftrightarrow{R}_{public}|^m, p_2)$, representing $\overleftrightarrow{R}_{public}|^m := \text{Rand}(\overleftarrow{F}_{p_2}|^m, p_1, \tilde{a})(\mod p_2)$;

wherein $\text{Rand}(\overleftarrow{F}_{p_2}|^m, p_1, \tilde{a})$ is a key randomization function of the second reference inverse p-array $\overleftarrow{F}_{p_2}|^m$ with respect to the key-generation randomization array $\overleftrightarrow{R}|_{(\tilde{a})}^m$, and is defined as $\text{Rand}(\overleftarrow{F}_{p_2}|^m, p_1, \tilde{a})=p_1(\overleftarrow{F}_{p_2}|^m \circledast \overleftrightarrow{R}|_{(\tilde{a})}^m)$, where $\circledast$ represents a convolution multiplication operator.

According to this disclosure, the encrypted communication system includes:

- a key server including:
  - a p-vector generation module configured to generate, based on a prime p and one of an arithmetic function and a classical string that serves as a seed, a p-vector $\overrightarrow{f}_p$ that relates to the prime p and that has infinite number of components, wherein the p vector $\overrightarrow{f}_p$ is defined as:

$$\overrightarrow{f}_p := [f(p^0), f(p^1), f(p^2), f(p^3), \ldots],$$

where $f$ represents said one of the arithmetic function and the classical string that serves as the seed;

- a p-array generation module coupled to said p-vector generation module, and configured to generate, based on the p-vector $\overrightarrow{f}_p$, a p-array $\overrightarrow{f}_p|_{s,t}^m$ that has m number of components and that relates the prime p and that is defined as:

$$\overrightarrow{f}_p|_{s,t}^m := \sum_{i=0}^{t} [f(p^{s+im}), \ldots, f(p^{s+im+(m-1)})],$$

where each of parameters m, s and t is a user-defined positive integer, and the prime p and the parameters s, t cooperatively compose a first parameter set I, and wherein the p-array $\overrightarrow{f}_p|_{s,t}^m$ is also represented as $\overrightarrow{f}|^m$;

- an associated matrix generation module coupled to said p-array generation module, and configured to generate, based on the p-array $\overrightarrow{f}|^m$, an associated matrix $[\overleftrightarrow{f}|^m]$ that is defined as:

$$[\overleftrightarrow{f}|^m] = \begin{pmatrix} \overrightarrow{f}|^m(0) & \overrightarrow{f}|^m(1) & \cdots & \overrightarrow{f}|^m(m-1) \\ \overrightarrow{f}|^m(m-1) & \overrightarrow{f}|^m(0) & \cdots & \overrightarrow{f}|^m(m-2) \\ \vdots & \vdots & \ddots & \vdots \\ \overrightarrow{f}|^m(1) & \overrightarrow{f}|^m(2) & \cdots & \overrightarrow{f}|^m(0) \end{pmatrix},$$

where $\overrightarrow{f}|^m(j)$ represents a $(j+1)^{th}$ of the m number of components of the p-array, $0 \leq j \leq (m-1)$;

- an inverse p-array generation module coupled to said associated matrix generation module, and configured to generated, based on the associated matrix $[\overleftrightarrow{f}|^m]$ and a modulus $\ell$ which is a user-defined positive integer, an inverse p-array $\overleftarrow{F}_\ell|^m$ with respect to the modulus $\ell$, which is defined as:

$$\overleftarrow{F}_\ell|^m := (L_\ell [1, 0, \ldots, 0][\overleftrightarrow{f}|^m]^*)(\mod \ell),$$

where $L_\ell$ represents an inverse modulus of a determinant of the associated matrix $[\overleftrightarrow{f}|^m]$ with respect to the modulus $\ell$, and is defined as: $L_\ell :=(\det[\overleftrightarrow{f}|^m])^{-1}(\mod \ell)$, and $[\overleftrightarrow{f}|^m]^*$ represents an adjoint matrix of the associated matrix $[\overleftrightarrow{f}|^m]$;

- a reference prime determining module configured to arbitrarily select a first reference prime $p_1$, and to determine a second reference prime $p_2$ based on a predetermined criterion that relates to the first reference prime $p_1$, a greatest one of the m number of components of the p-array $\overrightarrow{f}|^m$ which is denoted by b, a first reference positive integer $\tilde{a}$, and a second parameter set S that is composed of the parameter m, a second reference positive integer $\tilde{b}$ and a third reference positive integer r, wherein the predetermined criterion includes $p_2 > \max(p_1 m\tilde{a}\tilde{b}, mbr)$;
- a private key generation module coupled to said inverse p-array generation module and said reference prime determining module, and configured to acquire a first reference inverse p-array $\overleftarrow{F}_{p_1}|^m$ by making the first reference prime $p_1$ serve as the modulus $\ell$ in the inverse p-array $\overleftarrow{F}_\ell|^m$, the first reference inverse p-array $\overleftarrow{F}_{p_1}|^m$ serving as a private key $K_{private}$, which is defined as $K_{private}=(\overrightarrow{f}|^m, p_1, \tilde{a})$; and
- a public key generation module coupled to said inverse p-array generation module and said reference prime determining module, and configured to acquire a second reference inverse p-array $\overleftrightarrow{\mathcal{P}}_{p_2}|^m$ by making the second reference prime $p_2$ serve as the modulus $\ell$ in the inverse p-array $\overleftrightarrow{\mathcal{P}}_\ell|^m$, and to generate a public key $K_{public}$ with respect to a key-generation randomization array $\overleftrightarrow{R}|_{(\tilde{a})}^m$ based on the second reference inverse p-array $\overleftrightarrow{\mathcal{P}}_{p_2}|^m$, the first reference prime $p_1$, the second reference prime $p_2$, and the key-generation randomization array $\overleftrightarrow{R}|_{(\tilde{a})}^m$, wherein the key-generation randomization array $\overleftrightarrow{R}|_{(\tilde{a})}^m$ has m number of numerical components between 0 and the first reference positive integer $\tilde{a}$, and the public key $K_{public}$ is paired with the private key $K_{private}$, and is an array $\overleftrightarrow{K}_{public}|^m$ that includes m number of numerical components and that is also denoted as $K_{public}=(\overleftrightarrow{K}|^m, p_2)$, representing $\overleftrightarrow{K}_{public}|^m := \text{Rand}(\overleftrightarrow{\mathcal{P}}_{p_2}|^m, p_1, \tilde{a})(\text{mode } p_2)$;

wherein $\text{Rand}(\overleftrightarrow{\mathcal{P}}_{p_2}|^m, p_1, \tilde{a})$ is a key generation randomization function of the second reference inverse p-array $\overleftrightarrow{\mathcal{P}}_{p_2}|^m$ with respect to the key-generation randomization array $\overleftrightarrow{R}|_{(\tilde{a})}^m$, and is defined as $\text{Rand}(\overleftrightarrow{\mathcal{P}}_{p_2}|^m, p_1, \tilde{a}) = p_1(\overleftrightarrow{\mathcal{P}}_{p_1}|^m \circledast \overleftrightarrow{R}|_{(\tilde{a})}^m)$, where $\circledast$ represents a convolution multiplication operator;

a transmitting end including a first that stores the public key $K_{public}$, the second reference prime $p_2$ and the second reference positive integer $\tilde{b}$, and a first processor coupled to said first storage unit; and a receiving end including a second storage unit that stores the private key $K_{private}$, the p-array $\overleftrightarrow{\mathcal{P}}|^m$, the first reference prime $p_1$ and the second reference prime $p_2$, and a second processor coupled to said second storage unit;

wherein, for a data array $\overleftrightarrow{M}|^m$ that corresponds to a plaintext to be transmitted to the receiving end and that has m number of numerical components, said first processor uses the public key $K_{public}$ and the second reference prime $p_2$ that are stored in said first storage unit, and an encryption randomization array $\overleftrightarrow{R}|_{(\tilde{b})}^m$ that has m number of numerical components between 0 and the second reference positive integer $\tilde{b}$, to perform an encryption procedure on the data array $\overleftrightarrow{M}|^m$, and acquires a ciphertext $\overleftrightarrow{Cipher}|^m$ with respect to the encryption randomization array $\overleftrightarrow{R}|_{(\tilde{b})}^m$, and said transmitting end transmits the ciphertext $\overleftrightarrow{Cipher}|^m$ to said receiving end via a first communication channel, wherein the ciphertext $\overleftrightarrow{Cipher}|^m$ has m number of encrypted numerical components;

wherein, upon receipt of the ciphertext $\overleftrightarrow{Cipher}|^m$ by said second processor, said second processor uses the private key $K_{private}$, the p-array $\overleftrightarrow{\mathcal{P}}|^m$, the first reference prime $p_1$ and the second reference prime $p_2$ that are stored in said second storage unit to perform a decryption procedure on the ciphertext $\overleftrightarrow{Cipher}|^m$, and acquires a plaintext array $\overleftrightarrow{M_1}|^m$ that has m number of decrypted numerical components and that is identical to the data array $\overleftrightarrow{M}|^m$.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
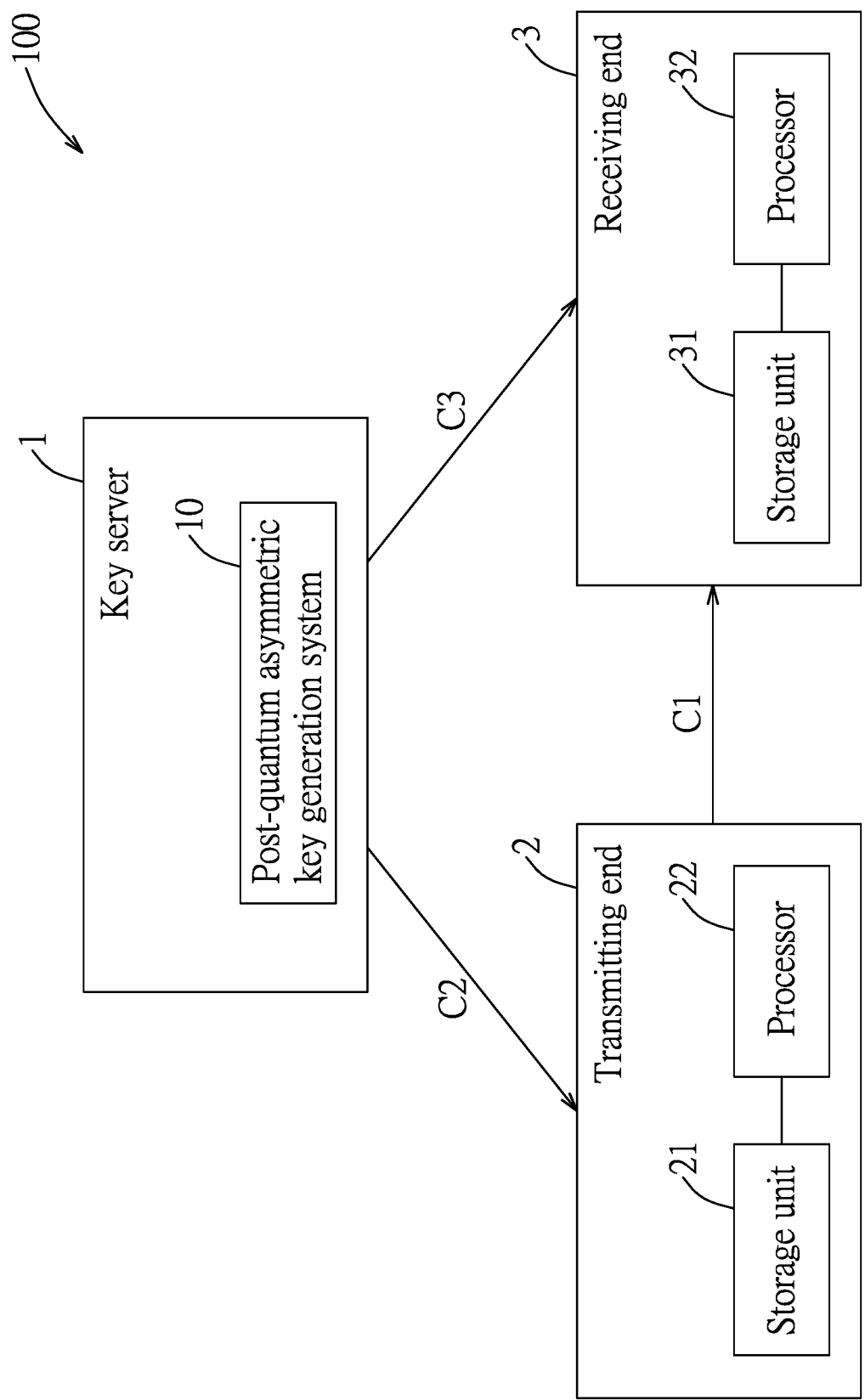
FIG. 1 is a block diagram illustrating an embodiment of the encrypted communication system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the encrypted communication system 100 according to this disclosure is shown to include a key server 1, and a plurality of user ends. Each user end may communicate with another user end based on a communication protocol that uses an encryption procedure and a decryption procedure. Each user end may serve as a transmitting end when transmitting messages, and serve as a receiving end when receiving messages. FIG. 1 simply exemplifies two user ends, one of which serves as a transmitting end 2 and the other one of which serves as a receiving end 3, but this disclosure is not limited in this respect. The transmitting end 2 includes a storage unit 21, and a processor 22 coupled to the storage unit 21. The receiving end 3 includes a storage unit 31, and a processor 32 coupled to the storage unit 31. In this embodiment, the key server 1 is independent from the transmitting end 2 and the receiving end 3. However, the key server 1 may be integrated within the transmitting end 2 in other embodiments.

Figure 2:
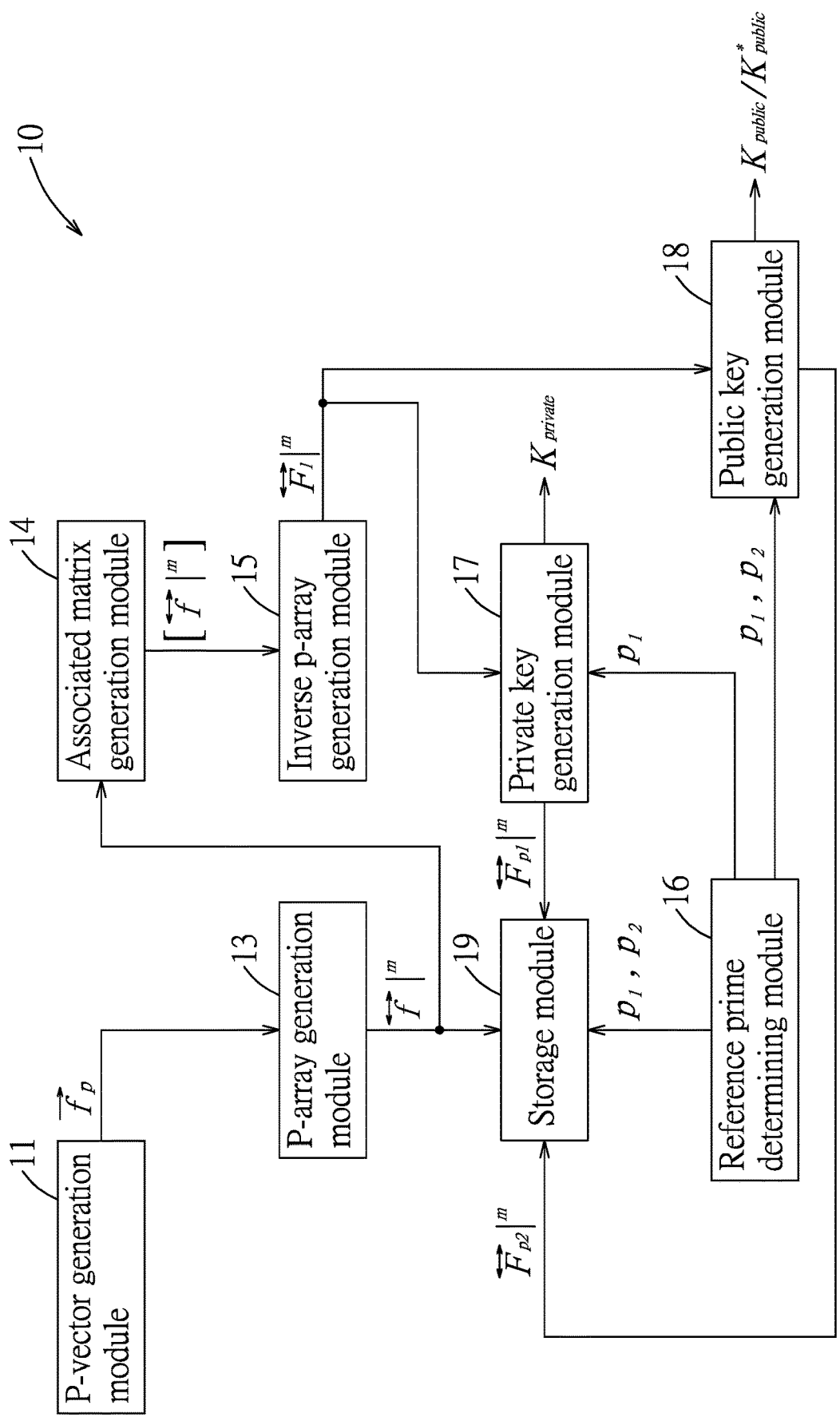
FIG. 2 is a block diagram illustrating a key server of the encrypted communication system.

The key server 1 is configured with a post quantum asymmetric key generation system 10. Referring to FIG. 2, the post-quantum asymmetric key generation system 10 includes a p-vector (prime vector) generation module 11, a p-array (prime array) generation module 13 coupled to the p-vector generation module 11, an associated matrix generation module 14 coupled to the p-array generation module 13, an inverse p-array generation module 15 coupled to the associated matrix generation module 14, a reference prime determining module 16, a private key generation module 17 coupled to the inverse p-array generation module 15 and the reference prime determining module 16, a public key generation module 18 coupled to the inverse p-array generation module 15 and the reference prime determining module and a storage module 19 coupled to the p-array generation module 13, the reference prime determining module 16, the private key generation module 17 and the public key generation module 18. It is noted that the p-vector generation module 11, the p-array generation module 13, the associated matrix generation module 14, the inverse p-array generation module 15, the reference prime determining module 16, the private key generation-module 17 and the public key generation module 18 may be integrated within a processor (not shown), but this disclosure is not limited in this respect.

Figure 3:
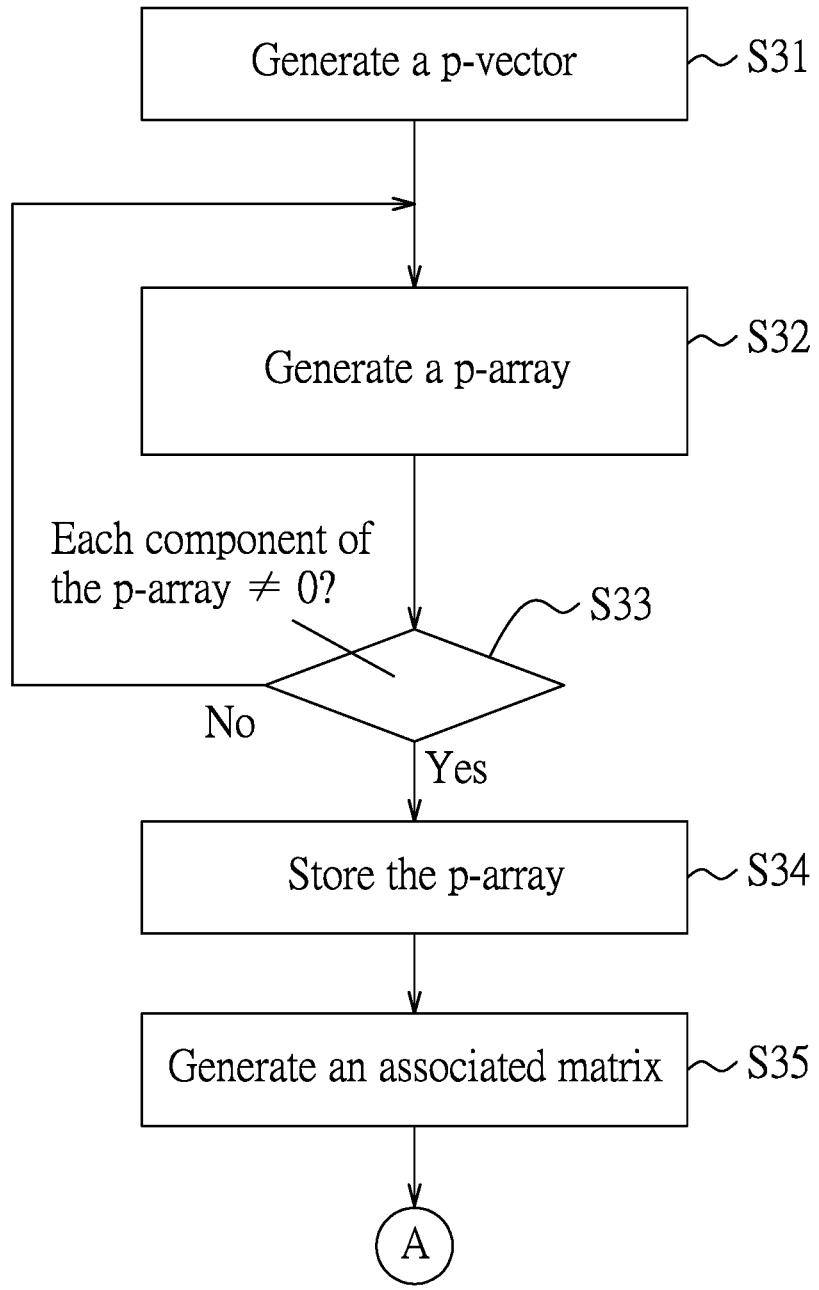
FIGS. 3 and 4 cooperatively form a flow chart illustrating steps of a key generation procedure according to the disclosure.
Figure 4:
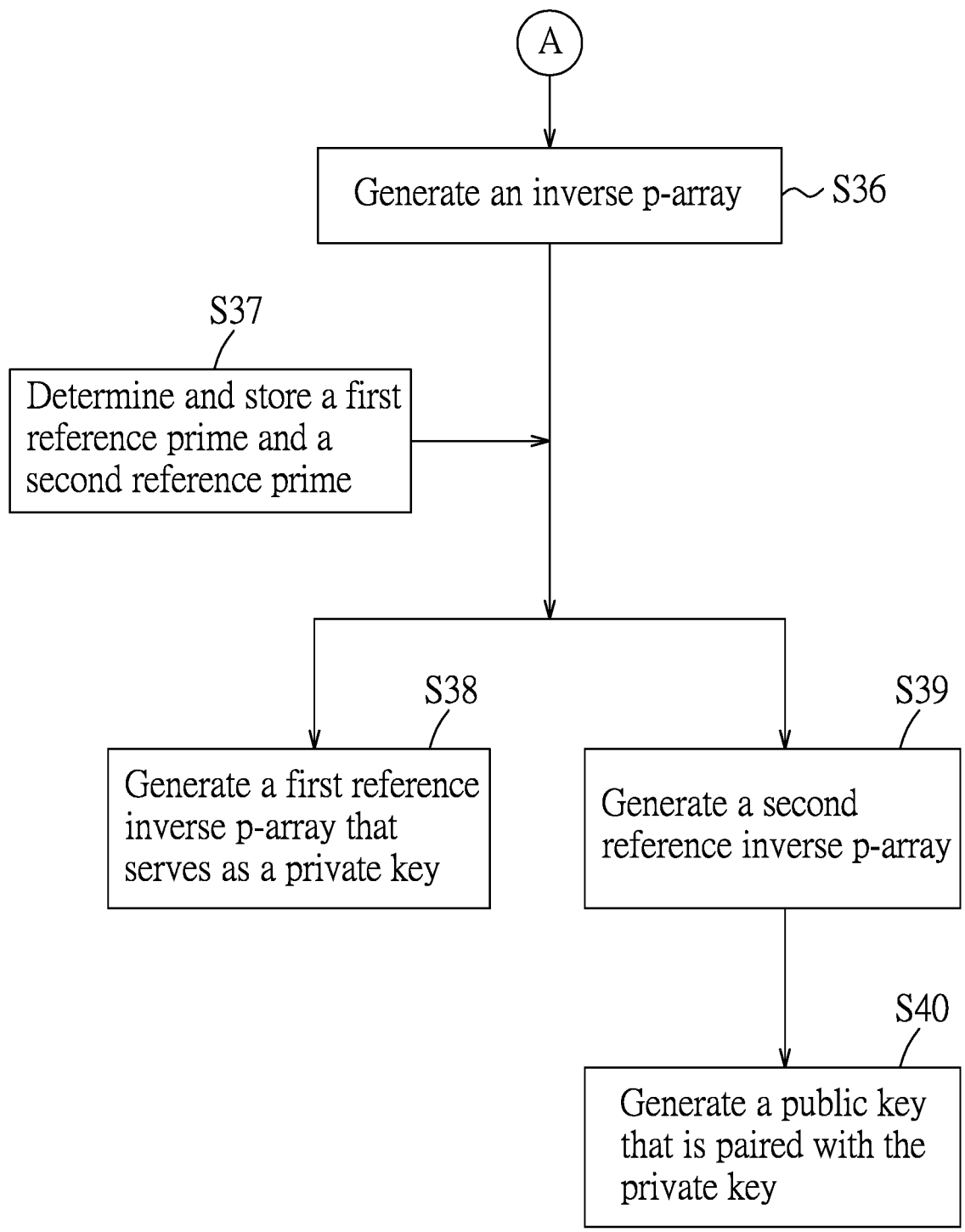

Before use of the encrypted communication system 100, the key server 1 generates asymmetric keys (e.g., a private key and at least one public key that is paired with the private key) for encryption and decryption. FIG. 3 and FIG. 4 cooperatively exemplify how the post-quantum asymmetric key generation system 10 exemplified in FIG. 2 performs an asymmetric key generation procedure.

In step S31, the p-vector generation module 11 generates, based on a prime p and one of an arithmetic function and a classical string (e.g., a sequence of integers, or characters which can be mapped to integers, such as ASCII codes) that serves as a seed (i.e., either the arithmetic function or the classical string serves as the seed), a p-vector $\vec{f}_p$ that relates to the prime p and that has an infinite number of components. In this embodiment, the p-vector $\vec{f}_p$ is defined as:

$$\vec{f}_p := [f(p^0), f(p^1), f(p^2), f(p^3), \ldots],$$

where $f$ is either the arithmetic function or the classical string that serves as the seed (for the latter case, $f(p^n)$ represents the n-th character in the classical string).

In one example, the seed is exemplified as an arithmetic function $f(p^n)$ of:
in case n=0, $f(p^n)=1$; and
in case n>0, $$f(p^n) = (-1)^n \times (\text{the } n^{th} \text{ number of the fractional part of } \sqrt{p}) \quad (1)$$

In step S32, the p-array generation module 13 generates, based on the p-vector $\vec{f}_p$, a p-array $\vec{\mathcal{F}}_p|_{s,t}^m$ that has m number of components and that relates to the prime p and that is defined as $$\vec{\mathcal{F}}_p|_{s,t}^m := \sum_{i=0}^{t} [f(p^{s+im}), \ldots, f(p^{s+im+(m-1)})],$$

where each of parameters m, s and t is a user-defined positive integer, and the prime p and the parameters s, t cooperatively compose a first parameter set I (also referred to as I=(p, s, t) hereinafter). The representation of the p-array $\vec{\mathcal{F}}_p|_{s,t}^m$ may be simplified as $\vec{\mathcal{F}}|^m$ hereinafter. For example, when I=(3, 0, 1) and m=5, the p-vector $\vec{f}_3$ and the p-array $\vec{\mathcal{F}}_3|_{0,1}^5$ (or simply $\vec{\mathcal{F}}|^5$) can be obtained as the following equations (2) and (3), respectively.

$$\vec{f}_3 = [1, -7, 3, -2, 0, -5, 0, -8, 0, -7, \ldots] \quad (2)$$

$$\vec{\mathcal{F}}_3|_{0,1}^5 = [1-5, -7+0, 3-8, -2+0, 0-7] \quad (3)$$
$$= [-4, -7, -5, -2, -7].$$

As another example, let $\vec{\mathcal{F}}|^5$ below be given by a secret function $f$ and a secret instance I:

$$\vec{\mathcal{F}}|^5 = [2, 81, 27, 9, 3] \quad (4)$$

The above two examples exemplarily show how the p-array is generated based on the seed and the first parameter set I. By saving the first parameter set I, the corresponding p-array can be obtained based on the seed at any time.

In step S33, the p-array generation module 13 determines whether each of the m number of components of the p-array $\vec{\mathcal{F}}|^m$ is not zero. When the determination is affirmative (i.e., all of the m number of components of the p-array $\vec{\mathcal{F}}|^m$ are non-zero), the p-array generation module 13 outputs the p-array $\vec{\mathcal{F}}|^m$ to the associated matrix generation module 14, and stores the p-array $\vec{\mathcal{F}}|^m$ into the storage module 19 (step 934). As an example, all of the five components of the p-array $\vec{\mathcal{F}}|^m$ as shown in each of equations (3) and (4) are not zero. When the p-array generation module 13 determines that any one of the m number of components of the p-array $\vec{\mathcal{F}}|^m$ is zero, the flow goes back to step S32 for the user to apply a different first parameter set I (i.e., at least one of the prime p and the parameters s, t in the new first parameter set I is different from that in the original first parameter set I) to step S32. Step S32 may be repeated with different first parameter sets I until the determination in step S33 is affirmative.

In step S35, the associated matrix generation module 14 generates an associated matrix $[\vec{\mathcal{F}}|^m]$ based on the p-array $\vec{\mathcal{F}}|^m$ received from the p-array generation module 13, and outputs the associated matrix $[\vec{\mathcal{F}}|^m]$ to the inverse p-array generation module 15. The associated matrix $[\vec{\mathcal{F}}|^m]$ is defined as:

$$[\vec{\mathcal{F}}|^m] = \begin{pmatrix} \vec{\mathcal{F}}|^m(0) & \vec{\mathcal{F}}|^m(1) & \ldots & \vec{\mathcal{F}}|^m(m-1) \\ \vec{\mathcal{F}}|^m(m-1) & \vec{\mathcal{F}}|^m(0) & \ldots & \vec{\mathcal{F}}|^m(m-2) \\ \vdots & \vdots & \ddots & \vdots \\ \vec{\mathcal{F}}|^m(1) & \vec{\mathcal{F}}|^m(2) & \ldots & \vec{\mathcal{F}}|^m(0) \end{pmatrix},$$

where $\vec{\mathcal{F}}|^m(j)$ represents a $(j+1)^{th}$ one of the m number of components of the p-array, $0 \leq j \leq (m-1)$. Following the p-array $\vec{\mathcal{F}}|^5$ in equation (4), the associated matrix $[\vec{\mathcal{F}}|^5]$ generated by the associated matrix generation module 14 would be as shown in equation (5).

$$[\vec{\mathcal{F}}|^5] = \begin{pmatrix} 2 & 81 & 27 & 9 & 3 \\ 3 & 2 & 81 & 27 & 9 \\ 9 & 3 & 2 & 81 & 27 \\ 27 & 9 & 3 & 2 & 81 \\ 81 & 27 & 9 & 3 & 2 \end{pmatrix} \quad (5)$$

In step S36, based on the associated matrix $[\vec{\mathcal{F}}|^m]$ and a modulus $\ell$ which is a user-defined positive integer, the inverse p-array generation module 15 generates an inverse p-array $\vec{\mathcal{F}}_\ell|^m$ with respect to the modulus $\ell$. The inverse p-array generation module 15 outputs the inverse p-array $\vec{\mathcal{F}}_\ell|^m$ to the private key generation module 17 and the public key generation module 18. The inverse p-array $\vec{\mathcal{F}}_\ell|^m$ is defined as:

$$\vec{\mathcal{F}}_\ell|^m := (L_\ell [1, 0, \ldots, 0])[L_\ell|^m]^*)(\bmod \ell),$$

where $\vec{\mathcal{F}}_\ell$ represents an inverse modulus of a determinant of the associated matrix $[\vec{\mathcal{F}}|^m]$ with respect to the modulus $\ell$, and is defined as: $L_\ell := (\det[\vec{\mathcal{F}}|^m])^{-1} (\bmod \ell)$, and $[\vec{\mathcal{F}}|^m]^*$ represents an adjoint matrix of the associated matrix $[\vec{\mathcal{F}}|^m]$.

In step S37, the reference prime determining module 16 arbitrarily selects a first reference prime $p_1$, and determines a second reference prime $p_2$ based on a predetermined criterion that relates to the first reference prime $p_1$, a greatest one of the m number of components of the p-array $\vec{\mathcal{F}}|^m$ which is denoted by b, a first reference positive integer ã, and a second parameter set S that is composed of the parameter m a second reference positive integer $\tilde{b}$ and a third reference positive integer r. The predetermined criterion includes $p_2 > \max(p_1 m \tilde{a} \tilde{b}, mbr)$. The reference prime determining module 16 outputs the first reference prime $p_1$ to the private key generation module 17, outputs the first reference prime $p_1$ and the second reference prime $p_2$ to the public key generation module 18, and stores the first reference prime $p_1$ and the second reference prime $p_2$ in the storage module 19. Following the example of equation (4), it is obtained that $\tilde{b} = \max(\vec{7}|^5) = 81$. In addition, under an exemplary condition of $S=(m, \tilde{b}, r)=(5, 120, 120)$ and $\tilde{a}=120$, when the reference prime determining module 16 selects $p_1=251$, the predetermined criterion would include:

$p_2 > p_1 m \tilde{a} \tilde{b} = 251 \times 5 \times 120 \times 120 = 8072000$, $p_2 > mbr = 5 \times 81 \times 120 = 48600$, so it may be determined, for example, that $p_2 = 18072001$, but this disclosure is not limited in this respect as long as the predetermined criterion is satisfied.

In step S38 that follows steps S36 and S37, the private key generation module 17 makes the first reference prime $p_1$ serve as the modulus $\ell$ in the inverse p-array $\vec{F}_\ell|^m$, so as to acquire a first reference inverse p-array $\vec{F}_{p_1}|^m$. The first reference inverse p-array $\vec{F}_{p_1}|^m$ serves as a private key $K_{private}$ (i.e., $K_{private} = \vec{F}_{p_1}|m^m$), which is defined as $K_{private} = (\vec{7}|^m, p_1, \tilde{a})$. The private key generation module 17 stores the first reference inverse p-array $\vec{F}_{p_1}|^m$ in the storage module 19. Following the previous example of equation (5) with $p_1=251$, since $\det([\vec{7}|^5]) \equiv 68 \pmod{251}$, it can be obtained that $L_{251} \equiv (68)^{-1} \pmod{251} = 48$, and the private key $K_{private}$ is acquired to be:

$$K_{private} = \vec{F}_{251}|^5 = (\vec{7}|^5, 251, 120) = (L_{251}[1, 0, \ldots, 0] \ [\vec{7}|^5]^*) \quad (6)$$

$$(\mod 251) = [164, 128, 92, 223, 74]$$

In step S39 that follows steps S36 and S37, the public generation module 18 makes the second reference prime $p_2$ serve as the modulus $\ell$ in the inverse p-array $\vec{F}_\ell|^m$ to as to acquire a second reference inverse p-array $\vec{F}_{p_2}|m^m$, and stores the second reference inverse p-array $\vec{F}_{p_2}|^m$ into the storage module 19. Following the previous example where m=5, p=3, $p_2=18072001$ and $\tilde{a}=120$, since $\det([\vec{7}|^5]) \equiv 16142697 \pmod{18072001}$ and $L_{18072001} \equiv 16142697^{-1} \equiv 17712763 \pmod{18072001}$, it is obtained that:

$$\vec{F}_{18072001}|^5 = (\vec{7}|^5, 18072001, 120) \quad (7)$$

$$= (L_{18072001}[1, 0, \ldots, 0][\vec{7}|^5]^*)$$

$$= [1287507, 11026277, 11798464, 16030112, 7400741]$$

In step S40, the public generation module 18 generates a public key $K_{public}$ with respect to a key-generation randomization array $\vec{R}|_{(\tilde{a})}^m$ based on the second reference inverse p-array $\vec{F}_{p_2}|^m$, the first reference prime $p_1$, the second reference prime $p_2$, and the key-generation randomization array $\vec{R}|_{(\tilde{a})}^m$. The key-generation randomization array $\vec{R}|_{(\tilde{a})}^m$ has m number of numerical components between 0 and the first reference positive integer $\tilde{a}$ (including 0 and $\tilde{a}$) (e.g., m number of random integers between 0 and $\tilde{a}$). The public key $K_{public}$ is paired with the private key $K_{private}$. In this embodiment, the public key $K_{public}$ is an array $\overleftrightarrow{K}_{public}|^m$ that includes m number of numerical components and that is also denoted as $K_{public} = (\overleftrightarrow{K}_{public}|^m, p_2)$, representing $\overleftrightarrow{K}_{public}|^m := Rand(\vec{F}_{p_2}|^m, p_1, \tilde{a}) \pmod{p_2}$. $Rand(\vec{F}_{p_2}|^m, p_1, \tilde{a})$ is a key generation randomization function of the second reference inverse p-array $\vec{F}_{p_2}|^m$ with respect to the key-generation randomization array $\vec{R}|_{(\tilde{a})}^m$, and is defined as $Rand(\vec{F}_{p_2}|^m, p_1, \tilde{a}) = p_1(\vec{F}_{p_2}|^m \circledast \vec{R}|_{(\tilde{a})}^m)$, where $\circledast$ represents a convolution multiplication operator. Following the previous example where m=5, p=3, $p_1=251$, $p_2=18072001$, $\tilde{a}=120$ and $\vec{F}_{18072001}|^5$ in equation (7), in a case where an exemplary key-generation randomization array that is assumed to be $\vec{R}|_{(120)}^5 = [98, 83, 38, 114, 4]$ is used, the public key $K_{public}$ as obtained by using the private key $K_{private}$ in equation (6) as:

$$\overleftrightarrow{K}_{public}|^5 = Rand(\vec{F}_{18072001}|^5, 251, 120) \pmod{18072001} \quad (8)$$

$$= 251 \left( \vec{F}_{18072001}|^5, 251, 120 \circledast \vec{R} \Big|_{(120)}^5 \right) \pmod{18072001}$$

$$= [13126654, 5728821, 15683333, 5171087, 12284834].$$

However, the public key $K_{public}$ that is obtained using the private key $K_{private}$ in equation (6) is not limited to such. If another exemplarily key-generation randomization array that is assumed to be $\vec{R}^*|_{(120)}^5 = [58, 53, 7, 85, 90]$ is used by the public key $K^*_{public}$ is obtained using the private key $K_{private}$ in equation (6) as:

$$\overleftrightarrow{K}^*_{public}|^5 = [17687579, 12818350, 12426167, 13811533, 109530556] \quad (9)$$

In other words, the public key generation module 18 may generate different public keys that are paired with the same private key $K_{private}$ by using different key-generation randomization arrays, favoring the key server 1 in refresh of the public key.

After completion of the asymmetric key generation procedure, the key server 1 transmits the public key $K_{public}$ (in the case the public key $K_{public}$ is generated), the second reference prime $p_2$ and the second reference positive integer $\tilde{b}$ to the transmitting end 2 via a communication channel (C2, see FIG. 1) between the key server 1 and the transmitting end 2, and transmits the private key $K_{private}$, the p-array $\vec{7}|^m$, the first reference prime $p_1$ and the second reference prime $p_2$ to the receiving end 3 via a communication channel (C3, see FIG. 1) between the key server 1 and the receiving end 3.

Figure 5:
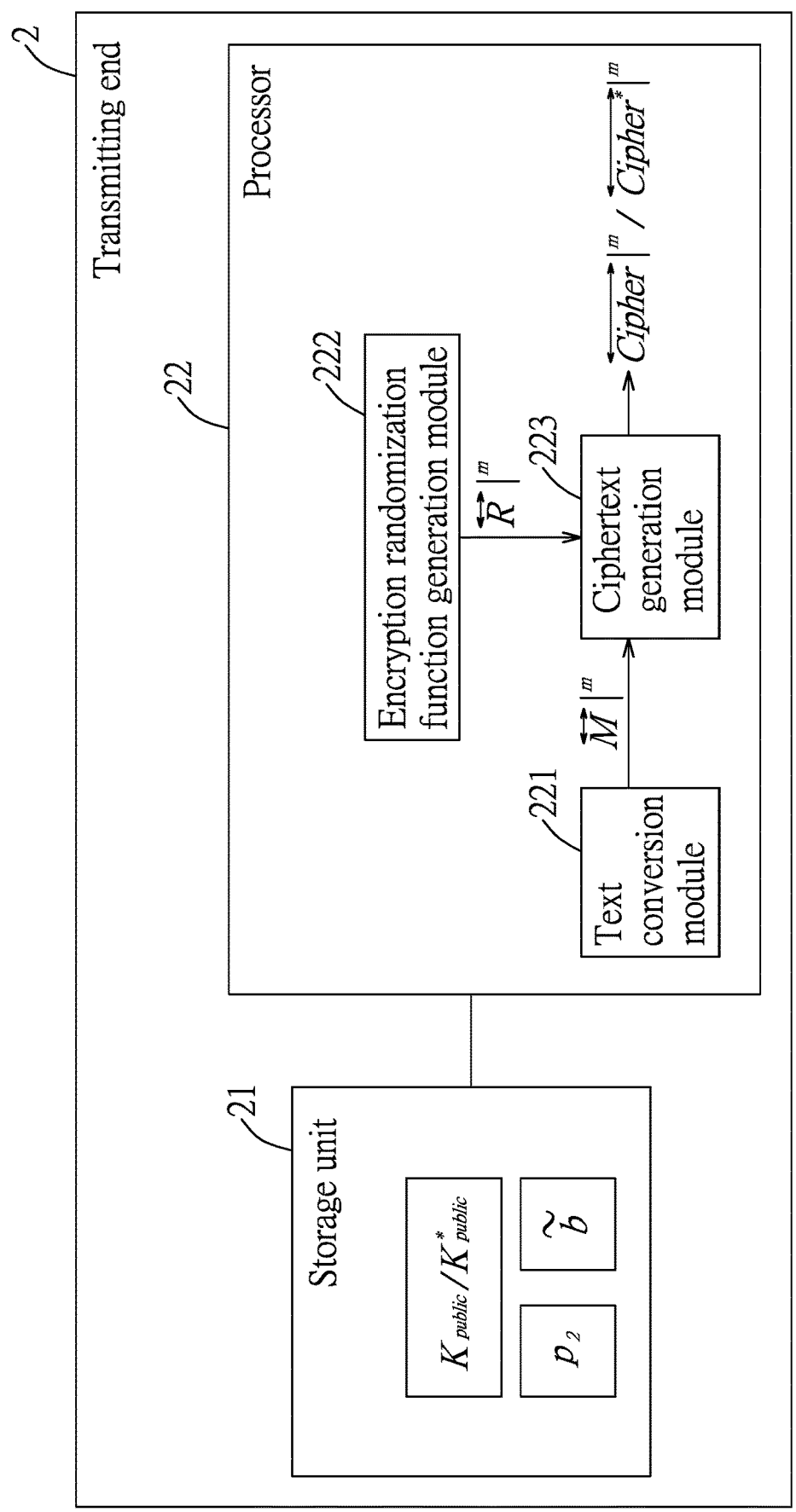
FIG. 5 is a block diagram illustrating a transmitting end of the encrypted communication system.

Referring to FIG. 5, the processor 22 of the transmitting end 2 stores the public key $K_{public}$, the second reference prime $p_2$ and the second reference positive integer $\tilde{b}$ received from the key server 1 into the storage unit 21. In this embodiment, the processor 22 is configured to have a text conversion module 221, an encryption randomization function generation module 222, and a ciphertext generation module 223 coupled to the text conversion module 221 and the encryption randomization function generation module 222.

Figure 7:
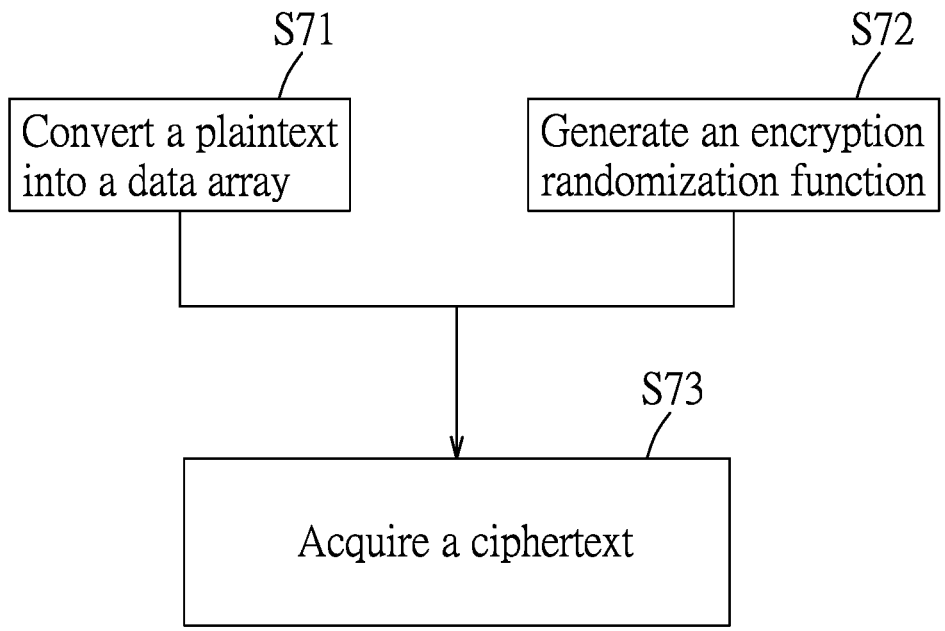
FIG. 7 is a flow chart illustrating steps of an encryption procedure according to the disclosure.

Further referring to FIG. 7, an encryption procedure performed by the transmitting end 2 is illustrated. In step S71, the text conversion module 221 uses a predetermined character-to-numeric technique, such as ASCII code, to convert a plaintext that is to be encrypted and that has m number of characters into a data array $\vec{y}|^m$ that has m number of numerical components. In detail, each of the m number of numerical components of the data array $\vec{M}|^m$ is between 0 and the first reference positive integer ã, and represents a corresponding one of the m number of characters of the plaintext. For example, in a case the plaintext is "Hello" (i.e., m=5), the data array $\vec{M}|^5$ that obtained based on the ASCII code would be:

$$\vec{M}|^5 = [72, 101, 108, 108, 111] \tag{10}$$

but this disclosure is not limited to any specific character-to-numeric technique.

In step S72, the encryption randomization function generation module 222 generates an encryption randomization function $\vec{R}|^m$ based on the public key $K_{public}$ and an encryption randomization array $\vec{R}|_{(\tilde{b})}^m$. The encryption randomization array $\vec{R}|_{(\tilde{b})}^m$ has m number of numerical components between 0 and the second reference positive integer $\tilde{b}$. The encryption randomization function $\vec{R}|^m$ is defined as $\vec{R}|^m := \text{Rand}(\vec{K}_{public}|^m, 1, \tilde{b})$. Following the previous example where the second parameter set S=(m, $\tilde{b}$, r)=(5, 120, 120) and the public key $K_{public} = \vec{K}_{public}|^5 = [13126654, 5728821, 15683333, 5171087, 12284834]$, in a case where the encryption randomization array is exemplified as $$\vec{R}|_{(\tilde{b})}^5 = \vec{R}_{encrypt_1}|_{(120)}^5 = [52, 45, 91, 95, 22],$$

the resultant encryption randomization function $\vec{R}|^5$ would be:

$$\vec{R}|^5 = \text{Rand}(\vec{K}_{public}|^5, 1, 120) \tag{11}$$
$$= [3321923152, 2842804607, 3548678919, 3013267698, 3131717969].$$

In another case where the encryption randomization array is exemplified as $\vec{R}|_{(\tilde{b})}^5 = \vec{R}_{encrypt_2}|_{(120)}^5 = [17, 23, 45, 90, 2]$, the resultant encryption randomization function $\vec{R}_1|^5$ would be:

$$\vec{R}_1|^5 = \text{Rand}(\vec{K}_{public}|^5, 1, 120) \tag{12}$$
$$= [2161360827, 1448885025, 2105056208, 1912390611, 1575374362].$$

In other words, the encryption randomization function generation module 222 may generate different encryption randomization functions by using different encryption randomization arrays.

In step S73 that follows steps S71 and S72, the ciphertext generation module 223 acquires a ciphertext $\overrightarrow{Cipher}|^m$ with respect to the encryption randomization function $\vec{R}|^m$ (received from the encryption randomization function generation module 222) by performing modulo operation on a sum of the data array $\vec{M}|^m$ (received from the text conversion module 221) and the encryption randomization function $\vec{R}|^m$ modulo the second reference prime $p_2$. The ciphertext $\overrightarrow{Cipher}|^m$ has m number of encrypted numerical components, and is represented by $\overrightarrow{Cipher}|^m := (\vec{M}|^m + \vec{R}|^m)(\text{mod } p_2)$. In the example where the data array $\vec{M}|^5$ and the encryption randomization function $\vec{R}|^5$ are as shown in equations (10) and (11), the resultant ciphertext $\overrightarrow{Cipher}|^5$ would be:

$$\overrightarrow{Cipher}|^5 = (\vec{M}|^5 + \vec{R}|^5)(\text{mod } 18072001) \tag{13}$$
$$= [14747041, 5500551, 6566831, 13315640, 5261907].$$

In the example where the data array $\vec{M}|^5$ and the encryption randomization function $\vec{R}_1|^5$ are as shown in equations (10) and (12), the resultant ciphertext $\overrightarrow{Cipher}_1|^5$ would be:

$$\overrightarrow{Cipher}_1|^5 = (\vec{M}|^5 + \vec{R}_1|^5)(\text{mod } 18072001) \tag{14}$$
$$= [10792780, 3125046, 8704200, 14830614, 3110386].$$

After completion of the encryption procedure, the transmitting end 2 transmits the ciphertext $\overrightarrow{Cipher}|^m$ to the receiving end 3 via a communication channel (C1, see FIG. 1) between the transmitting end 2 and the receiving end 3. The communication channel (C1) can be an unencrypted channel by virtue of the encrypted communication system 100 according to this disclosure.

Figure 6:
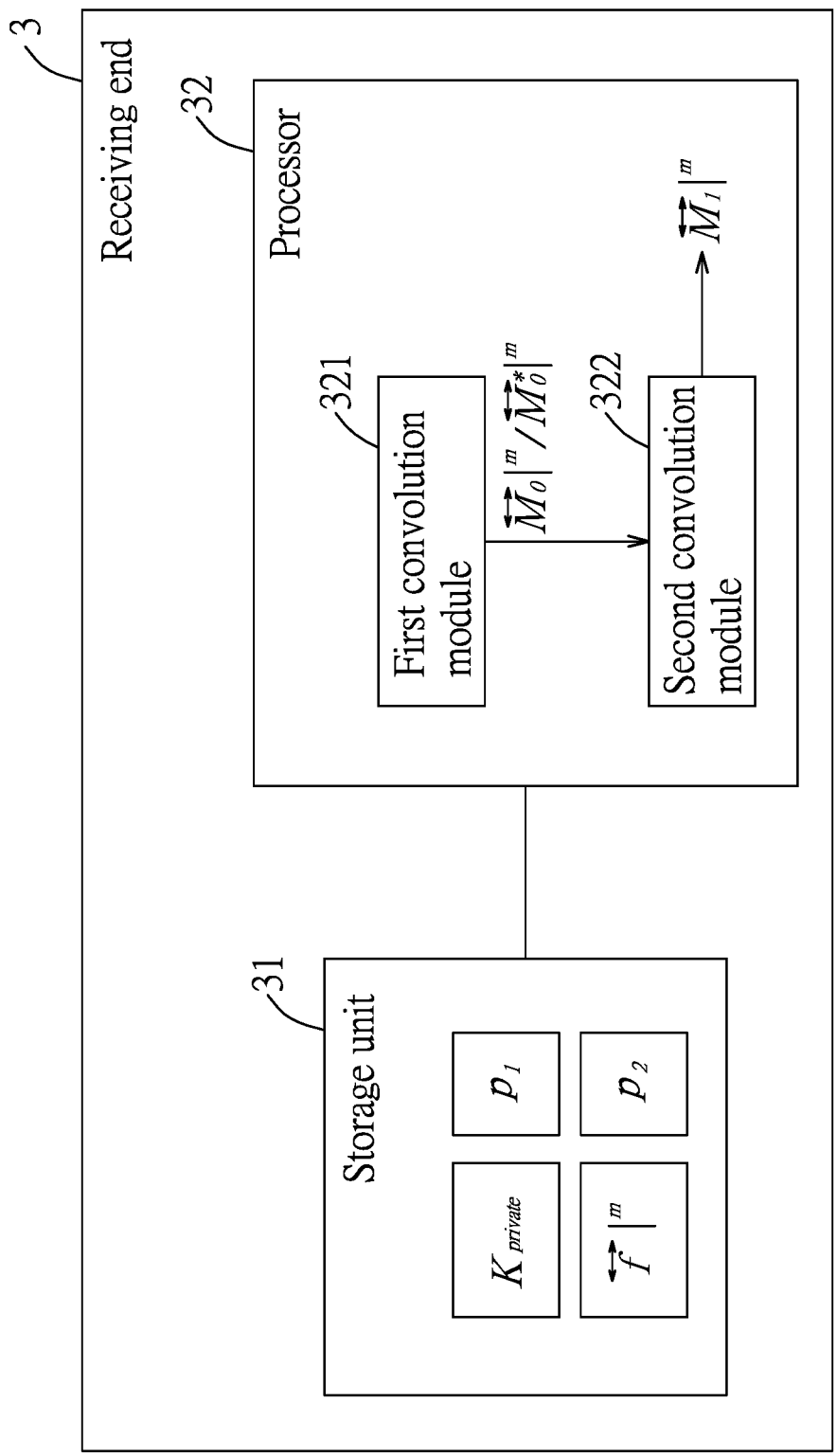
FIG. 6 is a block diagram illustrating a receiving end of the encrypted communication system.

Referring to FIG. 1 and FIG. 6, the processor 32 of the receiving end 3 stores the private key $K_{private}$, the p-array $\vec{p}|^m$, the first reference prime $p_1$ and the second reference prime $p_2$ received from the key server 1 into the storage unit 31. In this embodiment, the processor 32 is configured to have a first convolution module 321, and a second convolution module 322 coupled to the first convolution module 321.

Figure 8:
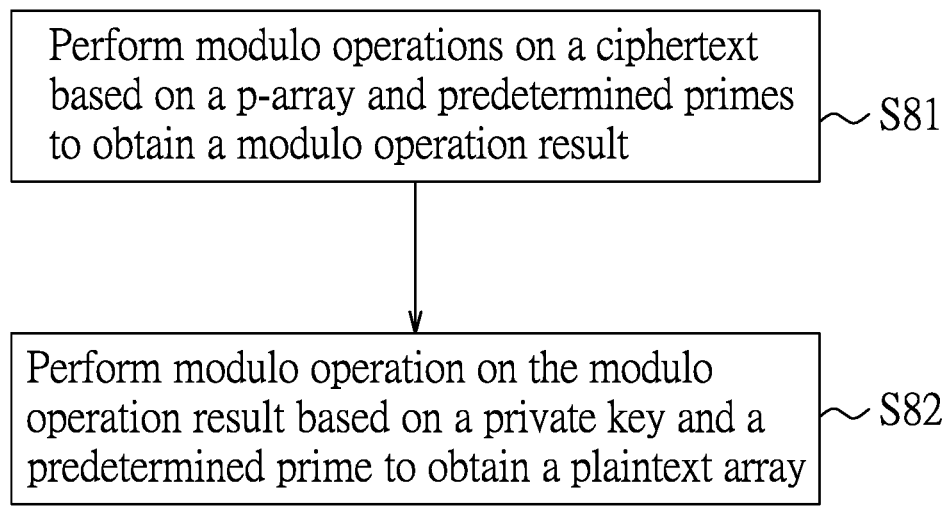
FIG. 8 is a flow chart illustrating steps of a decryption procedure according to the disclosure.

Further referring to FIG. 8, a decryption procedure to be performed on the ciphertext $\overrightarrow{Cipher}|^m$ received by the receiving end 3 is illustrated. In step S81, the first convolution module 321 computes a first convolution result of the ciphertext $\overrightarrow{Cipher}|^m$ and the p-array $\vec{p}|^m$ (i.e., $\overrightarrow{Cipher}|^m \circledast \vec{p}|^m$), performs modulo operation on the first convolution result modulo the second reference prime $p_2$ to obtain a first modulo operation results (i.e., $\overrightarrow{Cipher}|^m \circledast \vec{p}|^m)(\text{mod } p_2)$), and performs modulo operation on the first modulo operation result modulo the first reference prime $p_1$ to obtain a second modulo operation result $\vec{M_0}|^m$. The second modulo operation result $\vec{M_0}|^m$ is defined as $\vec{M_0}|^m := [(\overrightarrow{Cipher}|\circledast \vec{p}|^m)(\text{mod } p_2)](\text{mod } p_1)$. Following the previous example where $p_1=251$, $p_2=18072001$, the p-array is $\vec{p}|^5$ of equation (4) and the ciphertext $\overrightarrow{Cipher}|^5$ of equation (13), the resultant first modulo operation result and second modulo operation result would be as follows:

$$(\overrightarrow{Cipher}|^5 \circledast \vec{p}|^5)(\text{mod } 18072001) = \tag{15}$$
$$[5305912, 5220083, 4408431, 6184511, 4741098]$$
$$\vec{M_0}|^5 = [5305912, 5220083, 4408431, 61845511, 4741098](\text{mod } 251)$$
$$= [23, 36, 118, 122, 210].$$

Following another example where $p_1=251$, $p_2=18072001$, the p-array is $\vec{p}|^5$ of equation (4) and the ciphertext is $\overrightarrow{Cipher}_1|^5$ of equation (14), the resultant first modulo operation result and second modulo operation result would be as follows:

$$(\overrightarrow{Cipher_1}|^5 \circledast \overrightarrow{\mathcal{F}}_3|^5)(\mathrm{mod}\,18072001) = \qquad (16)$$

$$[2642300, 3569758, 1907467, 3871797, 3041577]$$

$$\overrightarrow{M_{0_1}}|^5 = [2642300, 3569758, 1907467, 3871797, 3041577]\,(\mathrm{mod}\,251)$$

$$= [23, 36, 118, 122, 210]$$

It is noted from equations (15) and (16) that the first convolution module 321 acquires the same second modulo operation result ($\overrightarrow{M_0}|^5 = \overrightarrow{M_{0_1}}|^5 = [23,36,118,122,210]$) by using different ciphertexts $\overrightarrow{Cipher}|^5$ and $\overrightarrow{Cipher_1}|^5$.

In step S82, the second convolution module 322 computes a second convolution result of the second modulo operation result $\overrightarrow{M_0}|^m$ and the first reference inverse p-array $\overrightarrow{\mathcal{F}}_{p_1}|^m$ that serves as the private key $K_{private}$, performs modulo operation on the second convolution result modulo the first reference prime $p_1$ to obtain a plaintext array $\overrightarrow{M_1}|^m$, which has m number of decrypted numerical components and which is defined as $\overrightarrow{M_1}|^m := \overrightarrow{M_0}|^m \circledast \overrightarrow{\mathcal{F}}_{p_1}|^m (\mathrm{mod}\ p_1)$. Following the previous example where $p_1=251$, the private key $K_{private}$ is $\overrightarrow{\mathcal{F}}_{251}|^5$ in equation (6) and the second modulo operation results is $\overrightarrow{M_0}|^5$ in equation (15), the obtained plaintext array $\overrightarrow{M_1}|^5$ would be:

$$\overrightarrow{M_1}|^5 = \overrightarrow{M_0}|^5 \circledast \overrightarrow{\mathcal{F}}_{251}|^5 \,(\mathrm{mod}\ 251)$$

$$\equiv [23, 36, 118, 122, 210] \circledast [164, 128, 92, 223, 74]\,(\mathrm{mod}\,251)$$

$$\equiv [72, 101, 108, 108, 111] = \mathrm{Hello}.$$

It can be seen that the obtained plaintext array $\overrightarrow{M_1}|^5$ is identical to the data array $\overrightarrow{M}|^5$ in equation (10). Accordingly, the receiving end 3 can successfully obtain the plaintext "Hello" by converting all the decrypted numerical components of the plaintext array $\overrightarrow{M_1}|^5$ into characters.

Referring to FIGS. 1 and 2 again, when the encrypted communication system 100 needs to perform key refresh, the public key generation module 18 of the key server 1 may be used to perform step S40 (see FIG. 4) for generating, with respect to a key-generation randomization array $\overrightarrow{R}^{\ddagger}|_{(\tilde{a})}^m$ (e.g., $\overrightarrow{R}^{\ddagger}|_{(120)}^5$) that is different from the key-generation randomization array $\overrightarrow{R}^{\ddagger}|_{(\tilde{a})}^m$ used to generate the original public key $K_{public}$, an updated public key $K^*_{public}$ (e.g., $\overrightarrow{K}^{\ddagger}_{public}|^5$ in equation (9)) that is paired with the private key $K_{private}$, based on the second reference inverse p-array $\overrightarrow{\mathcal{F}}_{p_2}|^m$, the first reference prime $p_1$, the second reference prime $p_2$, and the key-generation randomization array $\overrightarrow{R}^{\ddagger}|_{(\tilde{a})}^m$. Similarly, the updated public key $K^*_{public}$ can be represented as $\overrightarrow{K}^{\ddagger}_{public}|^m = \mathrm{Rand}(\overrightarrow{\mathcal{F}}_{p_2}|^m, p_1, \tilde{a})(\mathrm{mod}\ p_2) = p_1(\overrightarrow{\mathcal{F}}_{p_2}|^m \circledast \overrightarrow{R}^{\ddagger}|_{(\tilde{a})}^m)(\mathrm{mod}\ p_2)$, denoted as $K^*_{public} = (\overrightarrow{K}^{\ddagger}_{public}|^5, 18072001)$. Then, the key server 1 transmits the updated public key $K^*_{public}$ to the transmitting end 2 via the communication channel (C2), and the processor 22 of the transmitting end 2 updates the public key $K_{public}$ to the updated public key $K^*_{public}$ in the storage unit 21.

After the update of the public key in the storage unit 21, the processor 22 of the transmitting end 2 can use the updated public key $K^*_{public}$, the second reference prime $p_2$, and the encryption randomization array $\overrightarrow{R}|_{(\tilde{b})}^m$ to perform the encryption procedure on the data array $\overrightarrow{M}|^m$, and acquire another ciphertext $\overrightarrow{Cipher}^{\ddagger}$ with respect to the updated public key $K^*_{public}$ and the encryption randomization array $\overrightarrow{R}|_{(\tilde{b})}^m$.

The ciphertext $\overrightarrow{Cipher}^{\ddagger}$ has m number of encrypted numerical components, and is transmitted to the receiving end 3 via the communication channel (C1) by the processor 22 of the transmitting end 2. Following the previous example where m=4, $\tilde{b}$=120, the data array is $\overrightarrow{M}|^5$ in equation (10) and the public key is $K^*_{public}$ in equation (9), when $\overrightarrow{R}|_{(\tilde{b})}^5 = \overrightarrow{R_{encrypt_4}}|_{(120)}^5 = [33,81,78,19,14]$, the resultant ciphertext $\overrightarrow{Cipher}^{\ddagger}|^5$ would be:

$$\overrightarrow{Cipher}^{\ddagger}|^5 = [18005199, 1895209, 12634479, 5802146,$$
$$12936752] \qquad (17).$$

In another case where $\overrightarrow{R}|_{(\tilde{b})}^5 = \overrightarrow{R_{encrypt_4}}|_{(120)}^5 = [13,25,19,92,54]$, the resultant ciphertext $\overrightarrow{Cipher_1^{\ddagger}}|^5$ would be:

$$\overrightarrow{Cipher_1^{\ddagger}}|^5 = [17286247, 11666092, 5342822, 6738991,$$
$$2826645] \qquad (18)$$

When the processor 32 of the receiving end 3 receives the ciphertext $\overrightarrow{Cipher}^{\ddagger}$ from the transmitting end 2, the processor 32 uses the private key $K_{private}$, the p-array $\overrightarrow{\mathcal{F}}|^m$, the first reference prime $p_1$ and the second reference prime $p_2$ to perform the decryption procedure on the ciphertext $\overrightarrow{Cipher}^{\ddagger}$, so as to acquire the plaintext array $\overrightarrow{M_1}|^m$. Following the previous example where $p_1=251$, $p_2=18072001$, the p-array is $\overrightarrow{\mathcal{F}}|^5$ in equation (4) and the ciphertext is $\overrightarrow{Cipher}^{\ddagger}|^5$ in equation (17), where the resultant first modulo operation result and second modulo operation results $\overrightarrow{M_0}|^5$ would respectively be:

$$(\overrightarrow{Cipher}^{\ddagger}|^5 \circledast \overrightarrow{\mathcal{F}}|^5)(\mathrm{mod}\,18072001) =$$

$$[4541115, 4066487, 3590422, 3912710, 4450691]$$

$$\overrightarrow{M_0}|^5 = [4541115, 4066487, 3590422, 3912710, 4450691]\,(\mathrm{mod}\,251)$$

$$= [23, 36, 118, 122, 210]$$

In another example where $p_1=251$, $p_2=18072001$, the p-array is $\overrightarrow{\mathcal{F}}|^5$ in equation (4) and the ciphertext is $\overrightarrow{Cipher_1^{\ddagger}}|^5$ in equation (18), the resultant first modulo operation result and second modulo operation result $\overrightarrow{M_{0_1}}|^5$ would respectively be:

$$(\overrightarrow{Cipher_1^{\ddagger}}|^5 \circledast \overrightarrow{\mathcal{F}}|^5)(\mathrm{mod}\,18072001) =$$

$$[3669141, 3982904, 4102462, 3585155, 3217277]$$

$$\overrightarrow{M_{0_1}}|^5 = [3669141, 3982904, 4102462, 3585155, 3217277]\,(\mathrm{mod}\,251)$$

$$= [23, 36, 118, 122, 210].$$

It should be noted that even if the receiving end 3 receives different ciphertexts (e.g., $\overrightarrow{Cipher}^{\ddagger}|^5$ and $\overrightarrow{Cipher_1^{\ddagger}}|^5$) that are encrypted using the updated public key $K^*_{public}$, the same second modulo operation result ($\overrightarrow{M_0}|^5 = \overrightarrow{M_{0_1}}|^5 = [23,36,118,122,210]$) can be obtained using the private key $K_{private}$, so the same plaintext can be obtained.

Accordingly, it is known from the above detailed descriptions that:

1. The post-quantum asymmetric key generation system 10 can perform the asymmetric key generation procedure to generate a plurality of private keys by using only a single arithmetic function or classical string in cooperation with different combinations of the first parameter set I, the second parameter set S, the first reference prime $p_1$ and the second reference prime $p_2$;
2. For a specific private key, the post-quantum asymmetric key generation system 10 can generate a plurality of public keys each paired with the private key by use of a soft key reset algorithm, which is fast and which does not require recalculating the private key, so the key server 1 may perform key refresh more easily.

3. There is no unique way to generate the p-array. Some randomness can be added to the p-vector by zero padding, or adding randomness to the creation of the p-array.

4. Key space may be increased by selecting a larger parameter m, so to increase difficulty for the brute force attack. In this embodiment, selections of m=5 and $p_1$=251 are only for convenience of explanation. In a case where m=16 or even m=64, the possible key space may become so big that a brute force attack will take an absurd amount of time to succeed. The size of the message space and key space will contain a huge number of possibilities, making the brute force attack not work.

Table 1 lists experiment results of time required for encryption and decryption on different lengths of messages using the encrypted communication system 100 under a hardware specification of an octa-core processor and 32 GB RAM (random access memory).

TABLE 1

| Length of message (bytes) | Time for encryption (ms) | Time for decryption (ms) |
|---|---|---|
| 4 | 0.000193 | 0.001184 |
| 8 | 0.000225 | 0.001224 |
| 16 | 0.000279 | 0.000759 |
| 32 | 0.000399 | 0.001048 |
| 64 | 0.000687 | 0.001526 |
| 128 | 0.000886 | 0.002171 |
| 196 | 0.000997 | 0.002934 |

Based on the data in Table 1, it is known that use of the encrypted communication system 100 of this disclosure may reduce the time required for encryption and decryption by hundreds of times in comparison to the conventional AES and RSA protocols regardless of the length of message. Apparently, the encrypted communication system 100 of this disclosure can significantly increase speeds of encryption and decryption.

In the embodiment of this disclosure, the public key and the private key are generated based on the arithmetic function or classic strings, the p-vector, and the p-array which is essentially a vector, allowing encryption and decryption on a relatively large amount of data, and thereby enhancing speeds of encryption and decryption and ensuring security of data. The proposed encrypted communication system can ensure post-quantum security, namely, being capable of effectively resisting attack from post-quantum computers. Because of properties of the p-vector and p-array, hardware requirements for implementation of the embodiment are relatively low in terms of storage capacity and/or computation capability. The embodiment permits refresh of the public key without influencing use of the private key, enabling distributed key refresh for all users in the same network. Furthermore, since the arithmetic function $f$ used to create the private key is a function that can generate an infinite amount of data, multiple different public keys can be generated with only a single function.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A post-quantum asymmetric key generation method, comprising:

A) generating, by a first processor of a key server of an encrypted communication system, based on a prime p and one of an arithmetic function and a classical string that serves as a seed, a p-vector $\vec{f}_p$ that relates to the prime p and that has an infinite number of components, wherein the p-vector $\vec{f}_p$ is defined as:

$$\vec{f}_p := [f(p^0), f(p^1), f(p^2), f(p^3), \dots]$$

where $f$ represents said one of the arithmetic function and the classical string that serves as the seed;

B) generating, by the first processor, based on the p-vector $\vec{f}_p$, a p-array $\vec{f}_p|_{s,t}^m$ that has m number of components and that relates to the prime p and that is defined as:

$$\vec{f}_p|_{s,t}^m := \sum_{i=0}^{t} [f(p^{s+im}), \dots, f(p^{s+im+(m-1)})],$$

where each of parameters m, s and t is a user-defined positive integer, and the prime p and the parameters s, t cooperatively compose a first parameter set I, and wherein the p-array $\vec{f}_p|_{s,t}^m$ is also represented as $\vec{f}|^m$;

C) based on the p-array $\vec{f}|^m$, generating, by the first processor, an associated matrix $[\vec{f}|^m]$ that is defined as:

$$[\vec{f}|^m] = \begin{pmatrix} \vec{f}|^m(0) & \vec{f}|^m(1) & \dots & \vec{f}|^m(m-1) \\ \vec{f}|^m(m-1) & \vec{f}|^m(0) & \dots & \vec{f}|^m(m-2) \\ \vdots & \vdots & \ddots & \vdots \\ \vec{f}|^m(1) & \vec{f}|^m(2) & \dots & \vec{f}|^m(0) \end{pmatrix},$$

where $\vec{f}|^m(j)$ represents a $(j+1)^{th}$ one of the m number of components of the p-array, $0 \leq j \leq (m-1)$;

D) based on the associated matrix $[\vec{f}|^m]$ and a modulus I which is a user-defined positive integer, generating, by the first processor, an inverse p-array $\overleftrightarrow{F}_I|^m$ with respect to the modulus I, which is defined as:

$$\overleftrightarrow{F}_I|^m:=(L_I[1,0,\ldots,0][\overleftrightarrow{\mathcal{F}}|^m]^*)(\bmod\, l)$$

where $L_I$ represents an inverse modulus of a determinant of the associated matrix $[\overleftrightarrow{\mathcal{F}}|^m]$ with respect to the modulus I, and is defined as:

$L_I:=(\det[\overleftrightarrow{\mathcal{F}}|^m])^{-1}\,(\bmod\,l)$, and $[\overleftrightarrow{\mathcal{F}}|^m]^*$ represents an adjoint matrix of the associated matrix $[\overleftrightarrow{\mathcal{F}}|^m]$;

E) arbitrarily selecting, by the first processor, a first reference prime $p_1$, and determining a second reference prime $p_2$ based on a predetermined criterion that relates to the first reference prime $p_1$, a greatest one of the m number of components of the p-array $\overleftrightarrow{\mathcal{F}}|^m$ which is denoted by b, a first reference positive integer $\tilde{a}$, and a second parameter set S that is composed of the parameter m, a second reference positive integer $\tilde{b}$ and a third reference positive integer r, wherein the predetermined criterion includes $p_2 > \max(p_1 m\tilde{a}\tilde{b}, m\tilde{b}r)$;

F) acquiring, by the first processor, a first reference inverse p-array $\overleftrightarrow{F}_{p_1}|^m$ and a second reference inverse p-array by $\overleftrightarrow{F}_{p_2}|^m$ respectively making the first reference prime $p_1$ and the second reference prime $p_2$ serve as the modulus I in the inverse p-array $\overleftrightarrow{F}_I|^m$, the first reference inverse p-array $\overleftrightarrow{F}_{p_1}|^m$ serving as a private key $K_{private}$, which is defined as $K_{private}=(\overleftrightarrow{\mathcal{F}}|^m, p_1, \tilde{a})$; and G) generating, by the first processor, a public key $K_{public}$ with respect to a key-generation randomization array $\overleftrightarrow{R}_{(\tilde{a})}{}^m$ based on the second reference inverse p-array $\overleftrightarrow{F}_{p_2}|^m$, the first reference prime $p_1$, the second reference prime $p_2$, and the key-generation randomization array $\overleftrightarrow{R}_{(\tilde{a})}{}^m$, wherein the key-generation randomization array $\overleftrightarrow{R}_{(\tilde{a})}{}^m$ has m number of numerical components between 0 and the first reference positive integer $\tilde{a}$ and the public key $K_{public}$ is paired with the private key $K_{private}$, and is an array $\overrightarrow{K}_{public}|^m$ that includes m number of numerical components and that is also denoted as $K_{public}=(\overrightarrow{K}_{public}|^m, p_2)$, representing $\overleftrightarrow{K}_{public}|^m:=\text{Rand}(\overleftrightarrow{F}_{p_2}|^m, p_1, \tilde{a})\,(\bmod\, p_2)$;

wherein $\text{Rand}(\overleftrightarrow{F}_{p_2}|^m, p_1, \tilde{a})$ is a key-generation randomization function of the second reference inverse p-array $\overleftrightarrow{F}_{p_2}|^m$ with respect to the key-generation randomization array $\overleftrightarrow{R}_{(\tilde{a})}{}^m$, and is defined as $\text{Rand}(\overleftrightarrow{F}_{p_2}|^m, p_1, \tilde{a})=p_1(\overleftrightarrow{F}_{p_2}|^m \circledast \overleftrightarrow{R}_{(\tilde{a})}{}^m)$, where $\circledast$ represents a convolution multiplication operator;

whereby the public key $K_{public}$ and the private key $K_{private}$ are generated based on the arithmetic function and the classical string, the p-vector $\vec{f}_p$, and the p-array, thereby increasing speeds of encryption and decryption of the encrypted communication system;

the method further comprising:

using, by a second processor of a transmitter of the encrypted communication system, the public key $K_{public}$, the second reference prime $p_2$, and an encryption randomization array $\overleftrightarrow{R}_{(\tilde{b})}{}^m$ that has m number of numerical components between 0 and the second reference positive integer $\tilde{b}$ to perform an encryption procedure on a data array $\overleftrightarrow{M}|^m$ that corresponds to a plaintext to be transmitted and that has m number of numerical components, and acquiring, by the second processor, a ciphertext $\overleftrightarrow{Cipher}|^m$ with respect to the encryption randomization array $\overleftrightarrow{R}_{(\tilde{b})}{}^m$, wherein the ciphertext $\overleftrightarrow{Cipher}|^m$ has m number of encrypted numerical components; and transmitting, from the transmitter, the ciphertext $\overleftrightarrow{Cipher}|^m$ to a receiver of the encrypted communication system via a communication channel.

2. The method of claim 1, wherein the plaintext has m number of characters, and each of the m number of numerical components of the data array $\overleftrightarrow{M}|^m$ is between 0 and the first reference positive integer $\tilde{a}$, and represents a corresponding one of the m number of characters of the plaintext.

3. The encryption method of claim 1, wherein the encryption procedure includes:

generating, by the second processor, based on the public key $K_{public}$ and the encryption randomization array $\overleftrightarrow{R}_{(\tilde{b})}{}^m$, an encryption randomization function $\overleftrightarrow{R}|^m$ that is defined as $\overleftrightarrow{R}|^m:=\text{Rand}(\overleftrightarrow{K}_{public}|^m, 1, \tilde{b})$; and acquiring, by the second processor, the ciphertext $\overleftrightarrow{Cipher}|^m$ by performing, by the second processor, modulo operation on a sum of the data array $\overleftrightarrow{M}|^m$ and the encryption randomization function $\overleftrightarrow{R}|^m$ modulo the second reference prime $p_2$, the ciphertext $\overleftrightarrow{Cipher}|^m$ being represented by $\overleftrightarrow{Cipher}|^m:=(\overleftrightarrow{M}|^m + \overleftrightarrow{R}|^m)\,(\bmod\, p_2)$.

4. The method of claim 1, further comprising:

using, by a third processor of the receiver of the encrypted communication system, the p-array $\overleftrightarrow{\mathcal{F}}|^m$, the private key $K_{private}$, the first reference prime $p_1$ and the second reference prime $p_2$ to perform a decryption procedure on the ciphertext $\overleftrightarrow{Cipher}|^m$, and acquiring, by the third processor, a plaintext array $\overleftrightarrow{M_1}|^m$ that has m number of decrypted numerical components $\overleftrightarrow{Cipher}|^m, \overleftrightarrow{R}_{(\tilde{b})}{}^m, \overleftrightarrow{M}|^m, \overleftrightarrow{Cipher}|^m, \overleftrightarrow{R}_{(\tilde{b})}{}^m$.

5. The method of claim 4, wherein the decryption procedure includes:

performing, by the third processor, modulo operation on a first convolution result of the ciphertext $\overleftrightarrow{Cipher}|^m$ and the p-array $\overleftrightarrow{\mathcal{F}}|^m$ modulo the second reference prime $p_2$ to obtain a first modulo operation result, and performing, by the third processor, modulo operation on the first modulo operation result modulo the first reference prime $p_1$ to obtain a second modulo operation result $\overleftrightarrow{M_0}|^m$, which is defined as $\overleftrightarrow{M_0}|^m := [(\overleftrightarrow{Cipher}|^m \circledast \circledast \overleftrightarrow{\mathcal{F}}|^m)\,(\bmod\, p_2)]\,(\bmod\, p_1)$; and performing, by the third processor, modulo operation on a second convolution result of the second modulo operation result $\overleftrightarrow{M_0}|^m$ and the first reference inverse p-array $\overleftrightarrow{F}_{p_1}|^m$ that serves as the private key $K_{private}$ modulo the first reference prime $p_1$ to obtain the plaintext array $\overleftrightarrow{M_1}|^m$, which is defined as $\overleftrightarrow{M_1}|^m := \overleftrightarrow{M_0}|^m \circledast \overleftrightarrow{F}_{p_1}|^m$ (mod $p_1$).

6. A post-quantum asymmetric key generation system, comprising:
a key server including:
a p-vector generation coprocessor configured to generate, based on a prime p and one of an arithmetic function and a classical string that serves as a seed, a p-vector $\vec{f}_p$ that relates to the prime p and that has an infinite number of components, wherein the p-vector $\vec{f}_p$ is defined as:

$$\vec{f}_p := [f(p^0), f(p^1), f(p^2), f(p^3), \ldots]$$

where $f$ represents said one of the arithmetic function and the classical string that serves as the seed;
a p-array generation coprocessor coupled to said p-vector generation coprocessor, and configured to generate, based on the p-vector $\vec{f}_p$, a p-array $\vec{f}_p|_{s,t}^m$ that has m number of components and that relates to the prime p and that is defined as:

$$\vec{f}_p|_{s,t}^m := \sum_{i=0}^{t} [f(p^{s+im}), \ldots, f(p^{s+im+(m-1)})],$$

where each of parameters m, s and t is a user-defined positive integer, and the prime p and the parameters s, t cooperatively compose a first parameter set I, and wherein the p-array $\vec{f}_p|_{s,t}^m$, is also represented as $\vec{f}|^m$;
an associated matrix generation coprocessor coupled to said p-array generation coprocessor, and configured to generate, based on the p-array $\vec{f}|^m$, an associated matrix $[\vec{f}|^m]$ that is defined as:

$$[\vec{f}|^m] = \begin{pmatrix} \vec{f}|^m(0) & \vec{f}|^m(1) & \cdots & \vec{f}|^m(m-1) \\ \vec{f}|^m(m-1) & \vec{f}|^m(0) & \cdots & \vec{f}|^m(m-2) \\ \vdots & \vdots & \ddots & \vdots \\ \vec{f}|^m(1) & \vec{f}|^m(2) & \cdots & \vec{f}|^m(0) \end{pmatrix},$$

where $\vec{f}|^m(j)$ represents a $(j+1)^{th}$ one of the m number of components of the p-array, $0 \leq j \leq (m-1)$;
an inverse p-array generation coprocessor coupled to said associated matrix generation coprocessor, and configured to generate, based on the associated matrix $[\vec{f}|^m]$ and a modulus I which is a user-defined positive integer, an inverse p-array $\overleftrightarrow{F}_I|^m$ with respect to the modulus I, which is defined as:

$$\overleftrightarrow{F}_I|^m := (L_I[1,0,\ldots,0][\vec{f}|^m]^*)(\text{mod } I)$$

where $L_I$ represents an inverse modulus of a determinant of the associated matrix $[\vec{f}|^m]$ with respect to the modulus I, and is defined as: $L_I := (\det[\vec{f}|^m])^{-1} \pmod{I}$, and $[\vec{f}|^m]^*$ represents an adjoint matrix of the associated matrix $[\vec{f}|^m]$;
a reference prime determining coprocessor configured to arbitrarily select a first reference prime $p_1$, and to determine a second reference prime $p_2$ based on a predetermined criterion that relates to the first reference prime $p_1$, a greatest one of the m number of components of the p-array $\vec{f}|^m$ which is denoted by b, a first reference positive integer ã, and a second parameter set S that is composed of the parameter m, a second reference positive integer b̃ and a third reference positive integer r, wherein the predetermined criterion includes $p_2 > \max(p_1 m ã b, m b r)$;
a private key generation coprocessor coupled to said inverse p-array generation coprocessor and said reference prime determining coprocessor, and configured to acquire a first reference inverse p-array $\overleftrightarrow{F}_{p_1}|^m$ by making the first reference prime $p_1$ serve as the modulus I in the inverse p-array $\overleftrightarrow{F}_I|^m$, the first reference inverse p-array serving as a private key $K_{private}$, which is defined as $K_{private} = (\vec{f}|^m, p_1, ã)$; and
a public key generation coprocessor coupled to said inverse p-array generation coprocessor and said reference prime determining coprocessor, and configured to acquire a second reference inverse p-array $\overleftrightarrow{F}_{p_2}|^m$ by making the second reference prime $p_2$ serve as the modulus I in the inverse p-array $\overleftrightarrow{F}_I|^m$, and to generate a public key $K_{public}$ with respect to a key-generation randomization array $\overleftrightarrow{R}|_{(\tilde{a})}^m$ based on the second reference inverse p-array $\overleftrightarrow{F}_{p_2}|^m$, the first reference prime $p_1$, the second reference prime $p_2$, and the key-generation randomization array $\overleftrightarrow{R}|_{(\tilde{a})}^m$, wherein the key-generation randomization array $\overleftrightarrow{R}|_{(\tilde{a})}^m$ has m number of numerical components between 0 and the first reference positive integer ã, and the public key $K_{public}$ is paired with the private key $K_{private}$, and is an array $\overleftrightarrow{R}_{public}|^m$ that includes m number of numerical components and that is also denoted as $K_{public} = (\overleftrightarrow{R}_{public}|^m, p_2)$, representing $\overleftrightarrow{R}_{public}|^m := \text{Rand}(\overleftrightarrow{F}_{p_2}|^m, p_1, ã) \pmod{p_2}$;
wherein Rand $(\overleftrightarrow{F}_{p_2}|^m, p_1, ã)$ is a key-generation randomization function of the second reference inverse p-array $\overleftrightarrow{F}_{p_2}|^m$ with respect to the key-generation randomization array $\overleftrightarrow{R}|_{(\tilde{a})}^m$, and is defined as Rand $(\overleftrightarrow{F}_{p_2}|^m, p_1, ã) = p_1 (\overleftrightarrow{F}_{p_2}|^m \circledast \overleftrightarrow{R}|_{(\tilde{a})}^m)$, where $\circledast$ represents a convolution multiplication operator;
whereby the public key $K_{public}$ and the private key $K_{private}$ are generated based on the arithmetic function and the classical string, the p-vector $\vec{f}_p$, and the p-array, thereby increasing speeds of encryption and decryption of the encrypted communication system; and
the post-quantum asymmetric key generation system further comprising a transmitter including a processor configured to use the public key $K_{public}$, the second reference prime $p_2$, and an encryption randomization array $\overleftrightarrow{R}|_{(\tilde{b})}{}^m$ that has m number of numerical components between 0 and the second reference positive integer $\tilde{b}$ to perform an encryption procedure on a data array $\overleftrightarrow{R}|_{(\tilde{b})}{}^m$ that corresponds to a plaintext to be transmitted and that has m number of numerical components, and to acquire a ciphertext $\overleftrightarrow{Cipher}|^m$ with respect to the encryption randomization array $\overleftrightarrow{R}|_{(\tilde{b})}{}^m$, wherein the ciphertext $\overleftrightarrow{Cipher}|^m$ has m number of encrypted numerical components, the transmitter configured to transmit the ciphertext $\overleftrightarrow{Cipher}|^m$ to a receiver via a communication channel.

7. The post-quantum asymmetric key generation system of claim 6, the key server further comprising a computer storage coupled to said p-array generation coprocessor, said reference prime determining coprocessor, said private key generation coprocessor and said public key generation coprocessor, and storing the p-array $\vec{\jmath}|^m$ received from said p-array generation coprocessor, the first reference prime $p_1$ and the second reference prime $p_2$ received from said reference prime determining coprocessor, the first reference inverse p-array received from said private key generation coprocessor, and the second reference inverse p-array $\overleftrightarrow{F}_{p_2}|^m$ received from said public key generation coprocessor.

8. The post-quantum asymmetric key generation system of claim 7, wherein said public key generation coprocessor is further configured to generate, based on the second reference inverse p-array $\overleftrightarrow{F}_{p_2}|^m$, the first reference prime $p_1$, and the second reference prime $p_2$ that are stored in said computer storage and another key-generation randomization array $\overleftrightarrow{R^*}|_{(\tilde{a})}{}^m$ which is different from the key-generation randomization array $\overleftrightarrow{R}|_{(\tilde{a})}{}^m$, an updated public key $K^*_{public}$ with respect to said another key-generation randomization array $\overleftrightarrow{R}|_{(\tilde{a})}{}^m$, wherein the updated public key $K^*_{public}$ is paired with the private key $K_{private}$, and said another key-generation randomization array $\overleftrightarrow{R^*}|_{(\tilde{a})}{}^m$ has m number of numerical components between 0 and the first reference positive integer $\tilde{a}$, and the public key $K_{public}$ is also denoted as $K^*_{public}=(\overleftrightarrow{K^*}_{public}|^m, p_2)$, representing $\overleftrightarrow{K^*}_{public}|^m=\text{Rand}(\overleftrightarrow{F}_{p_2}|^m, p_1, \tilde{a})\pmod{p_2}=p_1(\overleftrightarrow{F}_{p_2}|^m\circledast \overleftrightarrow{R^*}|_{(\tilde{a})}{}^m)\pmod{p_2}$.

9. An encrypted communication system, comprising:
a key server including:
a p-vector generation coprocessor configured to generate, based on a prime p and one of an arithmetic function and a classical string that serves as a seed, a p-vector $\vec{f}_p$ is that relates to the prime p and that has infinite number of components, wherein the p-vector $\vec{f}_p$ is defined as:

$$\vec{f}_p:=[f(p^0),f(p^1),f(p^2),f(p^3),\ldots]$$

where $f$ represents said one of the arithmetic function and the classical string that serves as the seed;
a p-array generation coprocessor coupled to said p-vector generation coprocessor, and configured to generate, based on the p-vector $\vec{f}_p$, a p-array $\vec{\jmath}_p|_{s,t}{}^m$ that has m number of components and that relates the prime p and that is defined as:

$$\vec{\jmath}_p|_{s,t}{}^m := \sum_{i=0}^{t}[f(p^{s+im}),\ldots,f(p^{s+im+(m-1)})],$$

where each of parameters m, s and t is a user-defined positive integer, and the prime p and the parameters s, t cooperatively compose a first parameter set I, and wherein the p-array $\vec{\jmath}_p|_{s,t}{}^m$ is also represented as $\vec{\jmath}|^m$;
an associated matrix generation coprocessor coupled to said p-array generation coprocessor, and configured to generate, based on the p-array $\vec{\jmath}|^m$, an associated matrix $[\vec{\jmath}|^m]$ that is defined as:

$$[\vec{\jmath}|^m] = \begin{pmatrix} \vec{\jmath}|^m(0) & \vec{\jmath}|^m(1) & \ldots & \vec{\jmath}|^m(m-1) \\ \vec{\jmath}|^m(m-1) & \vec{\jmath}|^m(0) & \ldots & \vec{\jmath}|^m(m-2) \\ \vdots & \vdots & \ddots & \vdots \\ \vec{\jmath}|^m(1) & \vec{\jmath}|^m(2) & \ldots & \vec{\jmath}|^m(0) \end{pmatrix},$$

where $\vec{\jmath}|^m(j)$ represents a $(j+1)^{th}$ one of the m number of components of the p-array, $0\leq j\leq(m-1)$;
an inverse p-array generation coprocessor coupled to said associated matrix generation coprocessor, and configured to generate, based on the associated matrix $[\vec{\jmath}|^m]$ and a modulus I which is a user-defined positive integer, an inverse p-array $\overleftrightarrow{F}_I|^m$ with respect to the modulus I, which is defined as:

$$\overleftrightarrow{F}_I|^m:=(L_I[1,0,\ldots,0][\vec{\jmath}|^m]^*)\pmod{I}$$

where $L_I$ represents an inverse modulus of a determinant of the associated matrix $[\vec{\jmath}|^m]$ with respect to the modulus I, and is defined as: $L_I:=(\det[\vec{\jmath}|^m])^{-1}\pmod{I}$, and $[\vec{\jmath}|^m]^*$ represents an adjoint matrix of the associated matrix $[\vec{\jmath}|^m]$;
a reference prime determining coprocessor configured to arbitrarily select a first reference prime $p_1$, and to determine a second reference prime $p_2$ based on a predetermined criterion that relates to the first reference prime $p_1$, a greatest one of the m number of components of the p-array $\vec{\jmath}|^m$ which is denoted by b, a first reference positive integer $\tilde{a}$, and a second parameter set S that is composed of the parameter m, a second reference positive integer $\tilde{b}$ and a third reference positive integer r, wherein the predetermined criterion includes $p_2 > \max(p_1 m\tilde{a}\tilde{b}, mbr)$;
a private key generation coprocessor coupled to said inverse p-array generation coprocessor and said reference prime determining coprocessor, and configured to acquire a first reference inverse p-array $\overleftrightarrow{F}_{p_1}|^m$ by making the first reference prime $p_1$ serve as the modulus I in the inverse p-array $\overleftrightarrow{F}_I|^m$, the first reference inverse p-array $\overleftrightarrow{F}_{p_1}|^m$ serving as a private key $K_{private}$, which is defined as $K_{private}=(\vec{\jmath}|^m, p_1, \tilde{a})$; and
a public key generation coprocessor coupled to said inverse p-array generation coprocessor and said reference prime determining coprocessor, and configured to acquire a second reference inverse p-array $\overleftrightarrow{F'}_{p_2}|^m$ by making the second reference prime $p_2$ serve as the modulus I in the inverse p-array $\overleftrightarrow{F'}_I|^m$, and to generate a public key $K_{public}$ with respect to a key-generation randomization array $\overleftrightarrow{R}|_{(\tilde{a})}{}^m$ based on the second reference inverse p-array $\overleftrightarrow{F'}_{p_2}|^m$, the first reference prime $p_1$, the second reference prime $p_2$, and the key-generation randomization array $\overleftrightarrow{R}|_{(\tilde{a})}{}^m$, wherein the key-generation randomization array $\overleftrightarrow{R}|_{(\tilde{a})}{}^m$ has m number of numerical components between 0 and the first reference positive integer $\tilde{a}$ and the public key $K_{public}$ is paired with the private key $K_{private}$, and is an array $\overrightarrow{K}_{public}|^m$ that includes m number of numerical components and that is also denoted as $K_{public}=(\overrightarrow{K}_{public}|^m, p_2)$, representing $\overrightarrow{K}_{public}|^m:=\text{Rand}(\overleftrightarrow{F'}_{p_2}|^m, p_1, \tilde{a}) \pmod{p_2}$;

wherein Rand $(\overleftrightarrow{F'}_{p_2}|^m, p_1, \tilde{a})$ is a key-generation randomization function of the second reference inverse p-array $\overleftrightarrow{F'}_{p_2}|^m$ with respect to the key-generation randomization array $\overleftrightarrow{R}|_{(\tilde{a})}{}^m$, and is defined as Rand $(\overleftrightarrow{F'}_{p_2}|^m, p_1, \tilde{a})=p_1 (\overleftrightarrow{F'}_{p_2}|^m \circledast \overleftrightarrow{R}|_{(\tilde{a})}{}^m)$, where $\circledast$ represents a convolution multiplication operator;

whereby the public key $K_{public}$ and the private key $K_{private}$ are generated based on the arithmetic function and the classical string, the p-vector $\vec{f}_p$, and the p-array, thereby increasing speeds of encryption and decryption of the encrypted communication system;

a transmitter including a first computer storage that stores the public key $K_{public}$, the second reference prime $p_2$ and the second reference positive integer $\tilde{b}$, and a first processor coupled to said first computer storage; and a receiver including a second computer storage that stores the private key $K_{private}$, the p-array $\overrightarrow{f}|^m$, the first reference prime $p_1$ and the second reference prime $p_2$, and a second processor coupled to said second computer storage;

wherein, for a data array $\overrightarrow{M}|^m$ that corresponds to a plaintext to be transmitted to the receiver and that has m number of numerical components, said first processor uses the public key $K_{public}$ and the second reference prime $p_2$ that are stored in said first computer storage, and an encryption randomization array $\overleftrightarrow{R}|_{(\tilde{b})}{}^m$ that has m number of numerical components between 0 and the second reference positive integer $\tilde{b}$, to perform an encryption procedure on the data array $\overrightarrow{M}|^m$, and acquires a ciphertext $\overleftrightarrow{Cipher}|^m$ with respect to the encryption randomization array $\overrightarrow{M}|_{(\tilde{b})}{}^m$, and said transmitter transmits the ciphertext $\overleftrightarrow{Cipher}|^m$ to said receiver via a first communication channel, wherein the ciphertext $\overleftrightarrow{Cipher}|^m$ has m number of encrypted numerical components;

wherein, upon receipt of the ciphertext $\overleftrightarrow{Cipher}|^m$ by said second processor, said second processor uses the private key $K_{private}$, the p-array $\overrightarrow{f}|^m$, the first reference prime $p_1$ and the second reference prime $p_2$ that are stored in said second computer storage to perform a decryption procedure on the ciphertext $\overleftrightarrow{Cipher}|^m$, and acquires a plaintext array $\overrightarrow{M_1}|^m$ that has m number of decrypted numerical components and that is identical to the data array $\overrightarrow{M}|^m$.

10. The encrypted communication system of claim 9, wherein the plaintext has m number of characters, and said first processor has a text conversion coprocessor configured to use a predetermined character-to-numeric technique to convert the plaintext into the data array $\overrightarrow{M}|^m$; and
wherein each of the m number of numerical components of the data array $\overrightarrow{M}|^m$ is between 0 and the first reference positive integer $\tilde{a}$, and represents a corresponding one of the m number of characters of the plaintext.

11. The encrypted communication system of claim 10, wherein:
said first processor has an encryption randomization function generation coprocessor, and a ciphertext generation coprocessor coupled to said text conversion coprocessor and said encryption randomization function generation coprocessor; and
in the encryption procedure, said encryption randomization function generation coprocessor generates, based on the public key $K_{public}$ and the encryption randomization array $\overleftrightarrow{R}|_{(\tilde{b})}{}^m$, an encryption randomization function $\overleftrightarrow{R}|^m$ that is defined as $\overleftrightarrow{R}|^m:=\text{Rand}(\overrightarrow{K}_{public}|^m, 1, \tilde{b})$; and said ciphertext generation coprocessor acquires the ciphertext $\overleftrightarrow{Cipher}|^m$ by performing modulo operation on a sum of the data array $\overrightarrow{M}|^m$ and the encryption randomization function $\overleftrightarrow{R}|^m$ modulo the second reference prime $p_2$, the ciphertext $\overleftrightarrow{Cipher}|^m$ being represented by $\overleftrightarrow{Cipher}|^m:=(\overrightarrow{M}|^m + \overleftrightarrow{R}|^m) \pmod{p_2}$.

12. The encrypted communication system of claim 9, wherein:
said second processor has a first convolution coprocessor, and a second convolution coprocessor coupled to said first convolution coprocessor; and
in the decryption procedure, said first convolution coprocessor computes a first convolution result of the ciphertext $\overleftrightarrow{Cipher}|^m$ and the p-array $\overrightarrow{f}|^m$, performs modulo operation on the first convolution result modulo the second reference prime $p_2$ to obtain a first modulo operation result, and performs modulo operation on the first modulo operation result modulo the first reference prime $p_1$ to obtain a second modulo operation result $\overrightarrow{M_0}|^m$, which is defined as $\overrightarrow{M_0}|^m:=[(\overleftrightarrow{Cipher}|^m \circledast \overrightarrow{f}|^m) \pmod{p_2}] \pmod{p_1}$; and said second convolution coprocessor computes a second convolution result of the second modulo operation result $\overrightarrow{M_0}|^m$ and the first reference inverse p-array $\overleftrightarrow{F}_{p_1}|^m$ that serves as the private key $K_{private}$, performs modulo operation on the second convolution result modulo the first reference prime $p_1$ to obtain the plaintext array $\overrightarrow{M_1}|^m$, which is defined as $\overrightarrow{M_1}|^m := \overrightarrow{M_0}|^m \circledast \overleftrightarrow{F}_{p_1}|^m \pmod{p_1}$.

13. The encrypted communication system of claim 9, wherein:
before the public key $K_{public}$, the second reference prime $p_2$ and the second reference positive integer $\tilde{b}$ are stored in said first computer storage, said key server transmits the public key $K_{public}$, the second reference prime $p_2$ and the second reference positive integer $\tilde{b}$ to said transmitter via a second communication channel, and said first processor stores the public key $K_{public}$, the second reference prime $p_2$ and the second reference positive integer $\tilde{b}$ that are received from said key server into said first computer storage; and before the private key $K_{private}$, the p-array $\overrightarrow{f}|^m$, the first reference prime $p_1$ and the second reference prime $p_2$ are stored in said second computer storage, said key server transmits the private key $K_{private}$, the p-array $\overrightarrow{f}|^m$, the first reference prime $p_1$ and the second reference prime $p_2$ to said receiver via a third communication channel, and said second processor stores the private key $K_{private}$, the p-array $\overrightarrow{f}|^m$, the first reference prime $p_1$ and the second reference prime $p_2$ that are received from said key server into said second computer storage.

14. The encrypted communication system of claim 13, wherein said key server further includes a third computer storage coupled to said p-array generation coprocessor, said reference prime determining coprocessor, said private key generation coprocessor and said public key generation coprocessor, and storing the p-array $\overrightarrow{f}|^m$ received from said p-array generation coprocessor, the first reference prime $p_1$ and the second reference prime $p_2$ received from said reference prime determining coprocessor, the first reference inverse p-array $\overleftrightarrow{F}_{p_1}|^m$ received from said private key generation coprocessor, and the second reference inverse p-array $\overleftrightarrow{F}_{p_2}|^m$ received from said public key generation coprocessor.

15. The encrypted communication system of claim 14, wherein:
said public key generation coprocessor is further configured to generate, based on the second reference inverse p-array $\overleftrightarrow{F}_{p_2}|^m$, the first reference prime $p_1$, the second reference prime $p_2$, and another key-generation randomization array $\overleftrightarrow{R^*}|_{(\tilde{a})}^m$ which is different from the key-generation randomization array $\overleftrightarrow{R}|_{(\tilde{a})}^m$, an updated public key $K^*_{public}$ with respect to said another key-generation randomization array $\overleftrightarrow{R^*}|_{(\tilde{a})}^m$, wherein the updated public key $K^*_{public}$ is paired with the private key $K_{private}$, and said another key-generation randomization array $\overleftrightarrow{R^*}|_{(\tilde{a})}^m$ has m number of numerical components between 0 and the first reference positive integer $\tilde{a}$, and the public key $K_{public}$ is also denoted as $K^*_{public} = (\overleftrightarrow{K^*}_{public}|^m, p_2)$, representing $\overleftrightarrow{K^*}_{public}|^m = \text{Rand}(\overleftrightarrow{F}_{p_2}|^m, p_1, \tilde{a}) \pmod{p_2} = p_1 (\overleftrightarrow{F}_{p_2}|^m \circledast \overleftrightarrow{R^*}|_{(\tilde{a})}^m) \pmod{p_2}$;

said key server transmits the updated public key $K^*_{public}$ to said transmitter via the second communication channel;

upon receipt of the updated public key $K^*_{public}$ from said key server, said first processor updates the public key $K_{public}$ that is stored in said first computer storage to become the updated public key $K^*_{public}$;

after updating the public key $K_{public}$ to become the updated public key $K^*_{public}$, said first processor uses the updated public key $K^*_{public}$, the second reference prime $p_2$, and the encryption randomization array $\overleftrightarrow{R}|_{(\tilde{b})}^m$ to perform the encryption procedure on the data array $\overrightarrow{M}|^m$, and acquires another ciphertext $\overleftrightarrow{\text{Cipher}^*}$ with respect to the updated public key $K^*_{public}$ and the encryption randomization array $\overleftrightarrow{R}|_{(\tilde{b})}^m$, and said transmitter transmits said another ciphertext $\overleftrightarrow{\text{Cipher}^*}$ to said receiver via the first communication channel, wherein said another ciphertext $\overleftrightarrow{\text{Cipher}^*}$ has m number of encrypted numerical components; and upon receipt of said another ciphertext $\overleftrightarrow{\text{Cipher}^*}$ by said second processor, said second processor uses the private key $K_{private}$, the p-array $\overrightarrow{f}|^m$, the first reference prime $p_1$ and the second reference prime $p_2$ that are stored in said second computer storage to perform the decryption procedure on said another ciphertext $\overleftrightarrow{\text{Cipher}^*}$, and acquires the plaintext array $\overrightarrow{M_1}|^m$.

* * * * *